United States Patent
Burris et al.

(10) Patent No.: US 9,477,991 B2
(45) Date of Patent: Oct. 25, 2016

(54) METHODS AND SYSTEMS OF AGGREGATING INFORMATION OF GEOGRAPHIC CONTEXT REGIONS OF SOCIAL NETWORKS BASED ON GEOGRAPHICAL LOCATIONS VIA A NETWORK

(71) Applicant: Snap Trends, Inc., Austin, TX (US)

(72) Inventors: Brandon C. Burris, Austin, TX (US); Sean Harvell, Bastrop, TX (US)

(73) Assignee: Snap Trends, Inc., Austin, TX (US)

( * ) Notice: Subject to any disclaimer, the term of this patent is extended or adjusted under 35 U.S.C. 154(b) by 477 days.

(21) Appl. No.: 14/011,513

(22) Filed: Aug. 27, 2013

(65) Prior Publication Data
US 2015/0066901 A1  Mar. 5, 2015

(51) Int. Cl.
*G06Q 50/00* (2012.01)
*G06F 17/30* (2006.01)

(52) U.S. Cl.
CPC ......... *G06Q 50/00* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 3,636,421 A | 3/1972 | Barker et al. |
| 4,021,780 A | 5/1977 | Narey et al. |
| 4,255,619 A | 3/1981 | Saito |
| 4,445,118 A | 4/1984 | Taylor et al. |
| 4,536,647 A | 8/1985 | Atalla et al. |
| 4,757,267 A | 7/1988 | Riskin |
| 4,841,560 A | 6/1989 | Chan et al. |
| 4,845,504 A | 7/1989 | Roberts et al. |
| 4,922,516 A | 5/1990 | Butler et al. |
| 4,973,952 A | 11/1990 | Malec et al. |
| 4,974,170 A | 11/1990 | Bouve et al. |
| 4,977,399 A | 12/1990 | Price et al. |

(Continued)

FOREIGN PATENT DOCUMENTS

| | | |
|---|---|---|
| EP | 0712227 | 5/1996 |
| EP | 915590 | 5/1999 |

(Continued)

OTHER PUBLICATIONS

Bill N. Schilit and Marvin M. Theimer, Disseminating Active Map Information Mobile Hosts, IEEE Network, Sep./Oct. 1994.

(Continued)

*Primary Examiner* — Mariela Reyes
*Assistant Examiner* — Soheila Davanlou
(74) *Attorney, Agent, or Firm* — Yudell Isidore PLLC

(57) ABSTRACT

In one or more embodiments, one or more systems, devices, methods, and/or processes described can apply searches and/or filters to data of social networks with respect to one or more geographical search regions that intersect respective one or more geographical context regions. One or more social networks can be queried with search and/or filter parameters and one or more geographical context regions, and results received from the social network(s) can be based on the search and/or filter parameter(s) and the geographical context region(s) and presented to a user on a map or other user interface. One or more queries can be saved with their identification(s) of geographical context region(s) and their search and/or filter parameter(s) (e.g. saved queries) can continue to run and/or execute over one or more periods of time transpiring to provide continual and/or periodic reporting.

78 Claims, 17 Drawing Sheets

(56) References Cited

U.S. PATENT DOCUMENTS

| | | |
|---|---|---|
| 5,089,814 A | 2/1992 | DeLuca et al. |
| 5,095,532 A | 3/1992 | Mardus |
| 5,121,126 A | 6/1992 | Clagett |
| 5,122,795 A | 6/1992 | Cubley et al. |
| 5,131,020 A | 7/1992 | Liebesny et al. |
| 5,185,857 A | 2/1993 | Rozmanith et al. |
| 5,214,793 A | 5/1993 | Conway et al. |
| 5,223,844 A | 6/1993 | Mansell et al. |
| 5,243,652 A | 9/1993 | Teare et al. |
| 5,245,608 A | 9/1993 | Deaton et al. |
| 5,264,822 A | 11/1993 | Vogelman et al. |
| 5,265,070 A | 11/1993 | Minowa |
| 5,303,393 A | 4/1994 | Noreen et al. |
| 5,321,242 A | 6/1994 | Heath, Jr. |
| 5,347,632 A | 9/1994 | Filepp et al. |
| 5,363,377 A | 11/1994 | Sharpe |
| 5,365,516 A | 11/1994 | Jandrell |
| 5,371,794 A | 12/1994 | Diffie et al. |
| 5,390,237 A | 2/1995 | Hoffman et al. |
| 5,404,505 A | 4/1995 | Levinson |
| 5,432,841 A | 7/1995 | Rimer |
| 5,444,444 A | 8/1995 | Ross |
| 5,451,757 A | 9/1995 | Heath, Jr. |
| 5,455,807 A | 10/1995 | Nepple |
| 5,461,627 A | 10/1995 | Rypinski |
| 5,475,735 A | 12/1995 | Williams et al. |
| 5,485,163 A | 1/1996 | Singer et al. |
| 5,487,103 A | 1/1996 | Richardson |
| 5,493,309 A | 2/1996 | Bjornholt et al. |
| 5,497,414 A | 3/1996 | Bartholomew |
| 5,504,482 A | 4/1996 | Schreder |
| 5,511,111 A | 4/1996 | Serbetcioglu et al. |
| 5,511,233 A | 4/1996 | Otten |
| 5,512,908 A | 4/1996 | Herrick |
| 5,513,263 A | 4/1996 | White et al. |
| 5,528,248 A | 6/1996 | Steiner et al. |
| 5,539,395 A | 7/1996 | Buss et al. |
| 5,544,354 A | 8/1996 | May et al. |
| 5,559,520 A | 9/1996 | Barzegar et al. |
| 5,561,704 A | 10/1996 | Salimando |
| 5,566,235 A | 10/1996 | Hetz |
| 5,581,479 A | 12/1996 | McLaughlin |
| 5,583,864 A | 12/1996 | Lightfoot et al. |
| 5,586,254 A | 12/1996 | Kondo et al. |
| 5,588,042 A | 12/1996 | Comer |
| 5,590,196 A | 12/1996 | Moreau |
| 5,590,398 A | 12/1996 | Matthews |
| 5,592,470 A | 1/1997 | Rudrapatna et al. |
| 5,594,779 A | 1/1997 | Goodman |
| 5,596,625 A | 1/1997 | LeBlanc |
| 5,602,843 A | 2/1997 | Gray |
| 5,608,854 A | 3/1997 | Labedz et al. |
| 5,610,973 A | 3/1997 | Comer |
| 5,625,364 A | 4/1997 | Herrick et al. |
| 5,625,668 A | 4/1997 | Loomis |
| 5,627,549 A | 5/1997 | Park |
| 5,636,245 A | 6/1997 | Ernst et al. |
| 5,646,632 A | 7/1997 | Khan et al. |
| 5,654,959 A | 8/1997 | Baker et al. |
| 5,657,375 A | 8/1997 | Connolly et al. |
| 5,661,492 A | 8/1997 | Shoap et al. |
| 5,663,734 A | 9/1997 | Krasner |
| 5,664,948 A | 9/1997 | Dimitriadis et al. |
| 5,666,481 A | 9/1997 | Lewis |
| 5,677,905 A | 10/1997 | Bigham |
| 5,687,212 A | 11/1997 | Kinser, Jr. et al. |
| 5,689,431 A | 11/1997 | Rudow et al. |
| 5,694,453 A | 12/1997 | Fuller et al. |
| 5,701,301 A | 12/1997 | Weisser, Jr. |
| 5,704,049 A | 12/1997 | Briechle |
| 5,712,899 A | 1/1998 | Pace, II |
| 5,713,075 A | 1/1998 | Threadgill et al. |
| 5,714,948 A | 2/1998 | Farmakis et al. |
| 5,717,688 A | 2/1998 | Belanger et al. |
| 5,720,033 A | 2/1998 | Deo |
| 5,724,521 A | 3/1998 | Dedrick |
| 5,727,057 A | 3/1998 | Emery et al. |
| 5,729,680 A | 3/1998 | Belanger et al. |
| 5,771,283 A | 6/1998 | Chang et al. |
| 5,774,534 A | 6/1998 | Mayer |
| 5,778,304 A | 7/1998 | Grube et al. |
| 5,790,974 A | 8/1998 | Tognazzini |
| 5,794,210 A | 8/1998 | Goldhaber et al. |
| 5,796,727 A | 8/1998 | Harrison et al. |
| 5,798,733 A | 8/1998 | Ethridge |
| 5,806,018 A | 9/1998 | Smith et al. |
| 5,812,763 A | 9/1998 | Teng |
| 5,819,155 A | 10/1998 | Worthey et al. |
| 5,826,195 A | 10/1998 | Westerlage et al. |
| 5,835,061 A | 11/1998 | Stewart |
| 5,838,774 A | 11/1998 | Weisser, Jr. |
| 5,842,010 A | 11/1998 | Jain et al. |
| 5,845,211 A | 12/1998 | Roach |
| 5,852,775 A | 12/1998 | Hidary |
| 5,855,007 A | 12/1998 | Jovicic et al. |
| 5,870,555 A | 2/1999 | Pruett et al. |
| 5,870,724 A | 2/1999 | Lawlor et al. |
| 5,875,186 A | 2/1999 | Belanger et al. |
| 5,875,401 A | 2/1999 | Rochkind |
| 5,878,126 A | 3/1999 | Velamuri et al. |
| 5,880,958 A | 3/1999 | Helms et al. |
| 5,881,131 A | 3/1999 | Farris et al. |
| 5,884,284 A | 3/1999 | Peters et al. |
| 5,887,259 A | 3/1999 | Zicker et al. |
| 5,889,953 A | 3/1999 | Thebaut et al. |
| 5,892,454 A | 4/1999 | Schipper et al. |
| 5,896,440 A | 4/1999 | Reed et al. |
| 5,897,640 A | 4/1999 | Veghte et al. |
| 5,903,636 A | 5/1999 | Malik |
| 5,907,544 A | 5/1999 | Rypinski |
| 5,920,846 A | 7/1999 | Storch et al. |
| 5,922,040 A | 7/1999 | Prabhakaran |
| 5,923,702 A | 7/1999 | Brenner et al. |
| 5,933,420 A | 8/1999 | Jaszewski et al. |
| 5,938,721 A | 8/1999 | Dussell et al. |
| 5,949,867 A | 9/1999 | Sonnenberg |
| 5,950,130 A | 9/1999 | Coursey |
| 5,961,593 A | 10/1999 | Gabber et al. |
| 5,963,866 A | 10/1999 | Palamara et al. |
| 5,963,913 A | 10/1999 | Henneuse et al. |
| 5,968,176 A | 10/1999 | Nessett et al. |
| 5,969,678 A | 10/1999 | Stewart |
| 5,982,867 A | 11/1999 | Urban et al. |
| 5,983,091 A | 11/1999 | Rodriguez |
| 5,987,381 A | 11/1999 | Oshizawa |
| 5,991,287 A | 11/1999 | Diepstraten et al. |
| 5,995,015 A | 11/1999 | DeTemple et al. |
| 6,006,090 A | 12/1999 | Coleman et al. |
| 6,009,398 A | 12/1999 | Mueller et al. |
| 6,011,975 A | 1/2000 | Emery et al. |
| 6,018,293 A | 1/2000 | Smith et al. |
| 6,026,151 A | 2/2000 | Bauer et al. |
| 6,028,921 A | 2/2000 | Malik et al. |
| 6,047,327 A | 4/2000 | Tso et al. |
| 6,055,637 A | 4/2000 | Hudson et al. |
| 6,058,106 A | 5/2000 | Cudak et al. |
| 6,067,082 A | 5/2000 | Enmei |
| 6,067,297 A | 5/2000 | Beach |
| 6,076,080 A | 6/2000 | Morscheck et al. |
| 6,085,086 A | 7/2000 | La Porta et al. |
| 6,091,956 A | 7/2000 | Hollenberg |
| 6,101,381 A | 8/2000 | Tajima et al. |
| 6,101,443 A | 8/2000 | Kato et al. |
| 6,112,186 A | 8/2000 | Bergh et al. |
| 6,115,669 A | 9/2000 | Watanabe et al. |
| 6,122,520 A | 9/2000 | Want et al. |
| 6,133,853 A | 10/2000 | Obradovich et al. |
| 6,138,003 A | 10/2000 | Kingdon et al. |
| 6,138,119 A | 10/2000 | Hall et al. |
| 6,141,609 A | 10/2000 | Herdeg et al. |
| 6,144,645 A | 11/2000 | Struhsaker et al. |
| 6,154,152 A | 11/2000 | Ito |
| 6,154,637 A | 11/2000 | Wright et al. |
| 6,157,829 A | 12/2000 | Grube et al. |

(56) References Cited

U.S. PATENT DOCUMENTS

| | | |
|---|---|---|
| 6,157,946 A | 12/2000 | Itakura et al. |
| 6,163,274 A | 12/2000 | Lindgren |
| 6,167,255 A | 12/2000 | Kennedy, III et al. |
| 6,182,226 B1 | 1/2001 | Reid et al. |
| 6,184,829 B1 | 2/2001 | Stilp |
| 6,185,426 B1 | 2/2001 | Alperovich et al. |
| 6,185,484 B1 | 2/2001 | Rhinehart |
| 6,192,314 B1 | 2/2001 | Khavakh et al. |
| 6,202,054 B1 | 3/2001 | Lawlor et al. |
| 6,205,478 B1 | 3/2001 | Sugano et al. |
| 6,208,854 B1 | 3/2001 | Roberts et al. |
| 6,208,866 B1 | 3/2001 | Rouhollahzadeh et al. |
| 6,226,277 B1 | 5/2001 | Chuah |
| 6,229,477 B1 | 5/2001 | Chang et al. |
| 6,229,810 B1 | 5/2001 | Gerszberg et al. |
| 6,233,329 B1 | 5/2001 | Urban et al. |
| 6,233,452 B1 | 5/2001 | Nishino |
| 6,236,360 B1 | 5/2001 | Rudow et al. |
| 6,236,940 B1 | 5/2001 | Rudow et al. |
| 6,246,361 B1 | 6/2001 | Weill et al. |
| 6,259,405 B1 | 7/2001 | Stewart et al. |
| 6,263,209 B1 | 7/2001 | Reed et al. |
| 6,278,938 B1 | 8/2001 | Alumbaugh |
| 6,285,665 B1 | 9/2001 | Chuah et al. |
| 6,285,931 B1 | 9/2001 | Hattori et al. |
| 6,298,234 B1 | 10/2001 | Brunner |
| 6,308,273 B1 | 10/2001 | Goertzel et al. |
| 6,311,069 B1 | 10/2001 | Havinis et al. |
| 6,317,718 B1 | 11/2001 | Fano |
| 6,321,092 B1 | 11/2001 | Fitch et al. |
| 6,324,396 B1 | 11/2001 | Vasa et al. |
| 6,326,918 B1 | 12/2001 | Stewart |
| 6,327,254 B1 | 12/2001 | Chuah |
| 6,327,357 B1 | 12/2001 | Meek et al. |
| 6,332,127 B1 | 12/2001 | Bandera et al. |
| 6,332,163 B1 | 12/2001 | Bowman-Amuah |
| 6,340,958 B1 | 1/2002 | Cantu et al. |
| 6,343,290 B1 | 1/2002 | Cossins et al. |
| 6,353,664 B1 | 3/2002 | Cannon et al. |
| 6,359,880 B1 | 3/2002 | Curry et al. |
| 6,360,101 B1 | 3/2002 | Irvin |
| 6,366,561 B1 | 4/2002 | Bender |
| 6,377,548 B1 | 4/2002 | Chuah et al. |
| 6,377,810 B1 | 4/2002 | Geiger et al. |
| 6,377,982 B1 | 4/2002 | Rai et al. |
| 6,385,531 B2 | 5/2002 | Bates et al. |
| 6,385,591 B1 | 5/2002 | Mankoff |
| 6,389,426 B1 | 5/2002 | Turnbull et al. |
| 6,393,482 B1 | 5/2002 | Rai et al. |
| 6,400,722 B1 | 6/2002 | Chuah et al. |
| 6,407,673 B1 | 6/2002 | Lane |
| 6,408,307 B1 | 6/2002 | Semple et al. |
| 6,414,635 B1 | 7/2002 | Stewart et al. |
| 6,414,950 B1 | 7/2002 | Rai et al. |
| 6,415,019 B1 | 7/2002 | Savaglio et al. |
| 6,418,308 B1 | 7/2002 | Heinonen et al. |
| 6,421,441 B1 | 7/2002 | Dzuban |
| 6,421,714 B1 | 7/2002 | Rai et al. |
| 6,427,073 B1 | 7/2002 | Kortesalmi et al. |
| 6,427,119 B1 | 7/2002 | Stefan et al. |
| 6,430,276 B1 | 8/2002 | Bouvier et al. |
| 6,430,562 B1 | 8/2002 | Kardos et al. |
| 6,442,391 B1 | 8/2002 | Johansson et al. |
| 6,442,479 B1 | 8/2002 | Barton |
| 6,442,687 B1 | 8/2002 | Savage |
| 6,449,272 B1 | 9/2002 | Chuah et al. |
| 6,449,497 B1 | 9/2002 | Kirbas et al. |
| 6,452,498 B2 | 9/2002 | Stewart |
| 6,463,533 B1 | 10/2002 | Calamera et al. |
| 6,470,378 B1 | 10/2002 | Tracton et al. |
| 6,470,447 B1 | 10/2002 | Lambert et al. |
| 6,473,626 B1 | 10/2002 | Nevoux et al. |
| 6,477,382 B1 | 11/2002 | Mansfield et al. |
| 6,477,526 B2 | 11/2002 | Hayashi et al. |
| 6,484,029 B2 | 11/2002 | Hughes et al. |
| 6,484,092 B2 | 11/2002 | Seibel |
| 6,484,148 B1 | 11/2002 | Boyd |
| 6,490,291 B1 | 12/2002 | Lee et al. |
| 6,496,491 B2 | 12/2002 | Chuah et al. |
| 6,496,931 B1 | 12/2002 | Rajchel et al. |
| 6,505,046 B1 | 1/2003 | Baker |
| 6,505,048 B1 | 1/2003 | Moles et al. |
| 6,505,049 B1 | 1/2003 | Dorenbosch |
| 6,505,120 B2 | 1/2003 | Yamashita et al. |
| 6,505,163 B1 | 1/2003 | Zhang et al. |
| 6,512,754 B2 | 1/2003 | Feder et al. |
| 6,516,055 B1 | 2/2003 | Bedeski et al. |
| 6,516,416 B2 | 2/2003 | Gregg et al. |
| 6,519,252 B2 | 2/2003 | Sallberg |
| 6,519,458 B2 | 2/2003 | Oh et al. |
| 6,522,876 B1 | 2/2003 | Weiland et al. |
| 6,526,275 B1 | 2/2003 | Calvert |
| 6,526,349 B2 | 2/2003 | Bullock et al. |
| 6,532,418 B2 | 3/2003 | Chun et al. |
| 6,545,596 B1 | 4/2003 | Moon |
| 6,546,257 B1 | 4/2003 | Stewart |
| 6,560,442 B1 | 5/2003 | Yost et al. |
| 6,560,461 B1 | 5/2003 | Fomukong et al. |
| 6,577,643 B1 | 6/2003 | Rai et al. |
| 6,577,644 B1 | 6/2003 | Chuah et al. |
| 6,594,482 B1 | 7/2003 | Findikli et al. |
| 6,618,474 B1 | 9/2003 | Reese |
| 6,618,593 B1 | 9/2003 | Drutman et al. |
| 6,622,016 B1 | 9/2003 | Sladek et al. |
| 6,628,627 B1 | 9/2003 | Zendle et al. |
| 6,628,928 B1 | 9/2003 | Crosby et al. |
| 6,628,938 B1 | 9/2003 | Rachabathuni et al. |
| 6,633,633 B1 | 10/2003 | Bedingfield |
| 6,640,184 B1 | 10/2003 | Rabe |
| 6,647,257 B2 | 11/2003 | Owensby |
| 6,647,269 B2 | 11/2003 | Hendrey et al. |
| 6,650,901 B1 | 11/2003 | Schuster et al. |
| 6,654,610 B1 | 11/2003 | Chen et al. |
| 6,662,014 B1 | 12/2003 | Walsh |
| 6,665,536 B1 | 12/2003 | Mahany |
| 6,665,718 B1 | 12/2003 | Chuah et al. |
| 6,671,272 B2 | 12/2003 | Vaziri et al. |
| 6,675,017 B1 | 1/2004 | Zellner et al. |
| 6,675,208 B1 | 1/2004 | Rai et al. |
| 6,677,894 B2 | 1/2004 | Sheynblat et al. |
| 6,697,018 B2 | 2/2004 | Stewart et al. |
| 6,697,783 B1 | 2/2004 | Brinkman et al. |
| 6,701,160 B1 | 3/2004 | Pinder et al. |
| 6,701,251 B2 | 3/2004 | Stefan et al. |
| 6,704,311 B1 | 3/2004 | Chuah et al. |
| 6,716,101 B1 | 4/2004 | Meadows et al. |
| 6,721,406 B1 | 4/2004 | Contractor |
| 6,725,048 B2 | 4/2004 | Mao et al. |
| 6,732,080 B1 | 5/2004 | Blants |
| 6,732,101 B1 | 5/2004 | Cook |
| 6,732,176 B1 | 5/2004 | Stewart et al. |
| 6,738,808 B1 | 5/2004 | Zellner et al. |
| 6,754,504 B1 | 6/2004 | Reed |
| 6,754,582 B1 | 6/2004 | Smith et al. |
| 6,759,960 B2 | 7/2004 | Stewart et al. |
| 6,772,064 B1 | 8/2004 | Smith et al. |
| 6,799,049 B1 | 9/2004 | Zellner et al. |
| 6,801,509 B1 | 10/2004 | Chuah et al. |
| 6,816,720 B2 | 11/2004 | Hussain et al. |
| 6,819,929 B2 | 11/2004 | Antonucci et al. |
| 6,820,062 B1 | 11/2004 | Gupta et al. |
| 6,829,475 B1 | 12/2004 | Lee et al. |
| 6,850,758 B1 | 2/2005 | Paul et al. |
| 6,867,733 B2 | 3/2005 | Sandhu et al. |
| 6,868,074 B1 | 3/2005 | Hanson |
| 6,874,011 B1 | 3/2005 | Spielman |
| 6,876,858 B1 | 4/2005 | Duvall et al. |
| 6,898,569 B1 | 5/2005 | Bansal et al. |
| 6,937,869 B1 | 8/2005 | Rayburn |
| 6,937,998 B1 | 8/2005 | Swartz et al. |
| 6,954,147 B1 | 10/2005 | Cromer et al. |
| 6,985,747 B2 | 1/2006 | Chithambaram |
| 6,999,572 B1 | 2/2006 | Shaffer et al. |
| 7,005,985 B1 | 2/2006 | Steeves |

(56) References Cited

U.S. PATENT DOCUMENTS

| | | | |
|---|---|---|---|
| 7,009,556 B2 | 3/2006 | Stewart et al. | |
| 7,023,995 B2 | 4/2006 | Olsson | |
| 7,043,231 B2 | 5/2006 | Bhatia et al. | |
| 7,058,594 B2 | 6/2006 | Stewart et al. | |
| 7,069,319 B2 | 6/2006 | Zellner et al. | |
| 7,085,555 B2 | 8/2006 | Zellner et al. | |
| 7,103,368 B2 | 9/2006 | Teshima | |
| 7,103,476 B2 | 9/2006 | Smith et al. | |
| 7,106,843 B1 | 9/2006 | Gainsboro et al. | |
| 7,110,749 B2 | 9/2006 | Zellner et al. | |
| 7,116,977 B1 | 10/2006 | Moton et al. | |
| 7,124,101 B1 | 10/2006 | Mikurak | |
| 7,130,630 B1 | 10/2006 | Enzmann et al. | |
| 7,139,722 B2 | 11/2006 | Perrella et al. | |
| 7,155,199 B2 | 12/2006 | Zalewski et al. | |
| 7,181,225 B1 | 2/2007 | Moton et al. | |
| 7,181,529 B2 | 2/2007 | Bhatia et al. | |
| 7,188,027 B2 | 3/2007 | Smith et al. | |
| 7,190,960 B2 | 3/2007 | Wilson et al. | |
| 7,203,502 B2 | 4/2007 | Wilson et al. | |
| 7,212,829 B1 | 5/2007 | Lau et al. | |
| 7,224,978 B2 | 5/2007 | Zellner et al. | |
| 7,236,799 B2 | 6/2007 | Wilson et al. | |
| RE39,717 E | 7/2007 | Yates et al. | |
| 7,245,925 B2 | 7/2007 | Zellner | |
| 7,260,378 B2 | 8/2007 | Holland et al. | |
| 7,272,493 B1 | 9/2007 | Hamrick et al. | |
| 7,292,939 B2 | 11/2007 | Smith et al. | |
| 7,295,924 B2 | 11/2007 | Smith et al. | |
| 7,362,851 B2 | 4/2008 | Contractor | |
| 7,383,052 B2 | 6/2008 | Moton et al. | |
| 7,966,306 B2 | 6/2011 | Strandell et al. | |
| 7,966,369 B1* | 6/2011 | Briere | G06Q 10/10 707/616 |
| 8,484,224 B1 | 7/2013 | Harris et al. | |
| 8,489,641 B1 | 7/2013 | Seefeld et al. | |
| 8,595,317 B1 | 11/2013 | Harris et al. | |
| 8,612,533 B1 | 12/2013 | Harris et al. | |
| 8,639,767 B1 | 1/2014 | Harris et al. | |
| 8,655,873 B2 | 2/2014 | Mitchell et al. | |
| 8,655,983 B1 | 2/2014 | Harris et al. | |
| 2001/0001239 A1 | 5/2001 | Stewart | |
| 2001/0007450 A1 | 7/2001 | Begum | |
| 2001/0021646 A1 | 9/2001 | Antonucci et al. | |
| 2001/0028301 A1 | 10/2001 | Geiger et al. | |
| 2001/0034709 A1 | 10/2001 | Stoifo et al. | |
| 2001/0049275 A1 | 12/2001 | Pierry et al. | |
| 2001/0051911 A1 | 12/2001 | Marks et al. | |
| 2002/0035474 A1 | 3/2002 | Alpdemir | |
| 2002/0037709 A1 | 3/2002 | Bhatia et al. | |
| 2002/0037722 A1 | 3/2002 | Hussain et al. | |
| 2002/0037731 A1 | 3/2002 | Mao et al. | |
| 2002/0037744 A1 | 3/2002 | Bhatia et al. | |
| 2002/0037750 A1 | 3/2002 | Hussain et al. | |
| 2002/0038362 A1 | 3/2002 | Bhatia et al. | |
| 2002/0038384 A1 | 3/2002 | Khan et al. | |
| 2002/0038386 A1 | 3/2002 | Bhatia et al. | |
| 2002/0046090 A1 | 4/2002 | Stewart | |
| 2002/0052781 A1 | 5/2002 | Aufricht et al. | |
| 2002/0077083 A1 | 6/2002 | Zellner et al. | |
| 2002/0077084 A1 | 6/2002 | Zellner et al. | |
| 2002/0077118 A1 | 6/2002 | Zellner et al. | |
| 2002/0077130 A1 | 6/2002 | Owensby | |
| 2002/0077897 A1 | 6/2002 | Zellner et al. | |
| 2002/0087335 A1 | 7/2002 | Meyers et al. | |
| 2002/0090932 A1 | 7/2002 | Bhatia et al. | |
| 2002/0095312 A1 | 7/2002 | Wheat | |
| 2002/0102993 A1 | 8/2002 | Hendrey et al. | |
| 2002/0107027 A1 | 8/2002 | O'Neil | |
| 2002/0120713 A1 | 8/2002 | Gupta et al. | |
| 2002/0161637 A1 | 10/2002 | Sugaya | |
| 2002/0173981 A1 | 11/2002 | Stewart | |
| 2002/0174147 A1 | 11/2002 | Wang et al. | |
| 2003/0003990 A1 | 1/2003 | Von Kohorn | |
| 2003/0016233 A1 | 1/2003 | Charpentier | |
| 2003/0018527 A1 | 1/2003 | Filepp et al. | |
| 2003/0140088 A1 | 7/2003 | Robinson et al. | |
| 2003/0169151 A1 | 9/2003 | Ebling et al. | |
| 2004/0002329 A1 | 1/2004 | Bhatia et al. | |
| 2004/0097243 A1 | 5/2004 | Zellner et al. | |
| 2004/0111269 A1 | 6/2004 | Koch | |
| 2004/0164898 A1 | 8/2004 | Stewart | |
| 2004/0186902 A1 | 9/2004 | Stewart et al. | |
| 2004/0203903 A1 | 10/2004 | Wilson et al. | |
| 2004/0205198 A1 | 10/2004 | Zellner et al. | |
| 2004/0266453 A1 | 12/2004 | Maanoja et al. | |
| 2005/0017068 A1 | 1/2005 | Zalewski et al. | |
| 2005/0043036 A1 | 2/2005 | Ioppe et al. | |
| 2005/0060365 A1 | 3/2005 | Robinson et al. | |
| 2005/0096067 A1 | 5/2005 | Martin | |
| 2005/0114777 A1 | 5/2005 | Szeto | |
| 2005/0151655 A1 | 7/2005 | Hamrick et al. | |
| 2005/0246097 A1 | 11/2005 | Hamrick et al. | |
| 2005/0272445 A1 | 12/2005 | Zellner | |
| 2006/0030335 A1 | 2/2006 | Zellner et al. | |
| 2006/0030339 A1 | 2/2006 | Zhovnirovsky et al. | |
| 2006/0059043 A1 | 3/2006 | Chan et al. | |
| 2006/0089134 A1 | 4/2006 | Moton et al. | |
| 2006/0094447 A1 | 5/2006 | Zellner | |
| 2006/0099966 A1 | 5/2006 | Moton et al. | |
| 2006/0099969 A1 | 5/2006 | Staton et al. | |
| 2006/0105784 A1 | 5/2006 | Zellner et al. | |
| 2006/0106537 A1 | 5/2006 | Hamrick et al. | |
| 2006/0164302 A1 | 7/2006 | Stewart et al. | |
| 2006/0167986 A1 | 7/2006 | Trzyna et al. | |
| 2006/0183467 A1 | 8/2006 | Stewart et al. | |
| 2006/0189327 A1 | 8/2006 | Zellner et al. | |
| 2006/0189332 A1 | 8/2006 | Benco et al. | |
| 2006/0195570 A1 | 8/2006 | Zellner et al. | |
| 2006/0253252 A1 | 11/2006 | Hamrick et al. | |
| 2007/0010260 A1 | 1/2007 | Zellner et al. | |
| 2007/0042789 A1 | 2/2007 | Moton et al. | |
| 2007/0105565 A1 | 5/2007 | Enzmann et al. | |
| 2007/0124721 A1 | 5/2007 | Cowing et al. | |
| 2007/0136603 A1 | 6/2007 | Kuecuekyan | |
| 2007/0162432 A1 | 7/2007 | Armstrong et al. | |
| 2007/0250920 A1 | 10/2007 | Lindsay | |
| 2008/0096529 A1 | 4/2008 | Zellner | |
| 2008/0132252 A1 | 6/2008 | Altman et al. | |
| 2008/0133336 A1 | 6/2008 | Altman et al. | |
| 2008/0294603 A1 | 11/2008 | Ranjan et al. | |
| 2009/0077658 A1* | 3/2009 | King | G06F 17/30619 726/21 |
| 2009/0132483 A1 | 5/2009 | Yang et al. | |
| 2009/0233622 A1 | 9/2009 | Johnson | |
| 2009/0233623 A1 | 9/2009 | Johnson | |
| 2009/0319518 A1* | 12/2009 | Koudas | G06F 17/30864 |
| 2010/0069035 A1 | 3/2010 | Johnson | |
| 2010/0198802 A1* | 8/2010 | Kraftsow | G06F 17/30687 707/706 |
| 2010/0227595 A1 | 9/2010 | Johnson | |
| 2010/0235748 A1 | 9/2010 | Johnson | |
| 2011/0021145 A1 | 1/2011 | Johnson | |
| 2011/0035401 A1 | 2/2011 | Nye | |
| 2011/0047117 A1 | 2/2011 | Sinha | |
| 2011/0078166 A1* | 3/2011 | Oliver | G06F 17/30864 707/760 |
| 2011/0123015 A1 | 5/2011 | Erhart et al. | |
| 2011/0126132 A1 | 5/2011 | Anderson et al. | |
| 2011/0137881 A1 | 6/2011 | Cheng et al. | |
| 2011/0159890 A1 | 6/2011 | Fortescue et al. | |
| 2011/0196855 A1 | 8/2011 | Wable et al. | |
| 2011/0307403 A1 | 12/2011 | Rostampour et al. | |
| 2012/0023088 A1 | 1/2012 | Cheng et al. | |
| 2012/0130973 A1* | 5/2012 | Tamm | G06F 17/30545 707/706 |
| 2012/0151045 A1 | 6/2012 | Anakata et al. | |
| 2012/0240044 A1 | 9/2012 | Johnson | |
| 2012/0290617 A1* | 11/2012 | Govindachetty | G06F 17/3087 707/771 |
| 2012/0316878 A1 | 12/2012 | Singleton et al. | |
| 2012/0323909 A1 | 12/2012 | Behforooz et al. | |

(56) References Cited

U.S. PATENT DOCUMENTS

| | | | | |
|---|---|---|---|---|
| 2013/0060769 | A1* | 3/2013 | Pereg | G06F 17/30672 707/728 |
| 2013/0097162 | A1 | 4/2013 | Corcoran et al. | |
| 2013/0144899 | A1 | 6/2013 | Lee et al. | |

FOREIGN PATENT DOCUMENTS

| | | |
|---|---|---|
| EP | 917320 | 5/1999 |
| EP | 935364 | 8/1999 |
| EP | 924914 | 4/2003 |
| EP | 779752 | 6/2004 |
| EP | 1435749 | 7/2004 |
| EP | 1445923 | 8/2004 |
| EP | 838933 | 4/2008 |
| GB | 2396779 | 6/2004 |
| JP | 01-194628 | 8/1989 |
| JP | 03-128540 | 5/1991 |
| JP | 07-234789 | 9/1995 |
| JP | 07-288514 | 10/1995 |
| JP | 07-319706 | 12/1995 |
| JP | 08-44568 | 2/1996 |
| JP | 08-87296 | 4/1996 |
| JP | 11-168478 | 6/1999 |
| WO | WO 98/19484 | 5/1998 |
| WO | WO 99/16263 | 4/1999 |
| WO | WO 99/27716 | 6/1999 |
| WO | WO 99/51005 | 10/1999 |
| WO | WO 99/55012 | 10/1999 |
| WO | WO 00/02365 | 1/2000 |
| WO | WO 00/76249 | 12/2000 |
| WO | WO 02/11407 | 2/2002 |
| WO | WO 2004/080092 | 9/2004 |

OTHER PUBLICATIONS

Andy Harter and Andy Hooper, A Distributed Location system for the Active Office, IEEE Network, Jan./Feb. 1994.
Max J. Egenhofer, Spatial SQL: A Query and Presentation Language, IEEE Network, Feb. 1994.
Mike Spreitzer and Marvin Theimer, Providing Location Information in a Ubiquitous Computing Environment, Proceedings of the Fourteenth ACM Symposium on Operating Systems Principles, Dec. 1993.
George W. Fitzmaurice, Situated Information Spaces and Spatially Aware Palmtop Computers, Communication of the ACM, Jul. 1993.
Ronald Azuma, Tracking Requirements for Augmented Reality, Communications of the ACM, vol. 36 No. 1, Jan. 1992.
Roy Want, et al., The Active Badge Location System, ACM Transactions on Information Systems, vol. 10, No. 1, Jan. 1992.
Marvin White, Emerging Requirements for Digital Maps for In-Vehicle Pathfinding and Other Traveller Assistance, Vehicular Navigation and Information Systems Conference Proceedings, Part 1, Oct. 1991.
Fred Phail, The Power of a Personal Computer for Car Information and Communications Systems, Vehicular Navigation and Information Systems Conference Proceedings, Part 1, Oct. 1991.
Thomas A. Dingus, et al., Human Factors Engineering the TravTek Driver Interface, Vehicular Navigation and Information Systems Conference Proceedings, Part II, Oct. 1991.
Michael Muffat et al., European Cooperation on Dual Mode Route Guidance Perspectives for Advanced Research Partners, Vehicular Navigation and Information Systems Conference Proceedings, Part II, Oct. 1991.
High-Performance Wireless Access Point for the Enterprise, ORiNOCO™ AP-100 Access Point for the Enterprise, Lucent Technologies, 2000.
MobileStar Network, MobileStar Network First to Provide Business Travelers with High-Speed Data Access via the Internet-Wirelessly, New York, NY, Jun. 24, 1998.
ORiNCO AP-1000—Getting Started, Lucent Technologies.
Harry Chen, et al., "Dynamic Service Discovery for Mobile Computing: Intelligent Agents Meet Jini in the Aether," Cluster Computing, Special Issue on Internet Scalability, vol. 4, No. 4, Feb. 2001.
3rd Generation Partnership Project: Technical Specification Group Services and System Aspects; Functional Stage 2 Description of Location Services in UMTS (1999).
http://www.openwave.com/us/news_room/press_releases/2001/20020320, "Open Wave Announces Availability to End-to-End Set of Location Services for Wireless Internet".
Trembly, A., "Wireless products arm road warriors," National Underwriter, vol. 105, No. 3, pp. 23-25, Dialog 02113577 67213220 (Jan. 2001).
Social Net Watcher, http://www.socialnetwatcher.com, Nov. 13, 2012.
900 feet, http://www.900feet.com, Nov. 13, 2012.
Fourwhere by Sysomos, http://fourwhere.com/, Nov. 13, 2012.
Monitter with GeoAware widget, http://monitter.com/widget/index.html, Nov. 13, 2012.
Brightplanet, http://www.brightplanet.com, Nov. 13, 2012.
HMS Technologies—TacTrend, http://www.hmstech.com/tactrend/index.asp, Nov. 13, 2012.
MomentFeed, http://momentfeed.com, Nov. 13, 2012.
VenueLabs, http://venuelabs.com/, Nov. 13, 2012.
Gisalerts, http://www.gisalerts.com/Default.aspx, Nov. 14, 2012.
SnapTrendsMarketing, SnapTrends Map Interface, YouTube.com, Feb. 22, 2013, <URL:http://www.youtube.com/watch?v=BXKMxWF7qlg>.
SnapTrends, Products, snaptrends.com, Jul. 4, 2013 <URL:http://web.archive.org/web20130704023358/http://snaptrends.com/products>.
International Application No. PCT/US2013/029480, International Search Report, May 9, 2013.
International Application No. PCT/US2013/056897, International Search Report, May 1, 2014.
International Application No. PCT/US2013/066119, International Search Report, Feb. 1, 2013.

* cited by examiner

METHODS AND SYSTEMS OF AGGREGATING INFORMATION OF GEOGRAPHIC CONTEXT REGIONS OF SOCIAL NETWORKS BASED ON GEOGRAPHICAL LOCATIONS VIA A NETWORK

BACKGROUND

1. Technical Field

This disclosure relates generally to the field of social media data analytics. More specifically, this disclosure relates to the field of analyzing data of one or more social networks with references to geographical locations and geographic context regions of the one or more social networks.

2. Description of the Related Art

Social networks receive data from their users and provide a social structure of sets of individuals, groups, and/or organizations with multiple dyadic associations and/or ties between or among the sets of individuals, groups, and/or organizations. For example, a social network can receive data provided by a user and share the received data with other users affiliated with the user and/or affiliated with other users affiliated with one or more groups and/or organizations. In one instance, the data provided by the user may include a status (e.g., a personal status), a picture, a motion picture (e.g., a video), a rating of a venue, a review of a venue, or an action or activity of the user. In another instance, the data provided by the user may include a message for one or more other users affiliated with and/or related to the user. Massive amounts of useful data have been accumulated on social networks but have not been strongly leveraged for use in security, marketing, or other applications. In particular, the related art has not used geospatial references, location-based context, or a map-based interface in ascertaining the meanings and relevance of this useful data or assisting in drawing conclusions based on the geographical aspects of this data. Moreover, the related art has not utilized geographic context regions of social networks in obtaining and analyzing data associated with the geographic context regions and has not analyzed meanings and relevance of this useful data or assisting in drawing conclusions based on the geographical aspects of this data.

BRIEF DESCRIPTION OF THE DRAWINGS

The embodiments will become apparent upon reading the following detailed description and upon reference to the accompanying drawings as follows.

Figure 1:
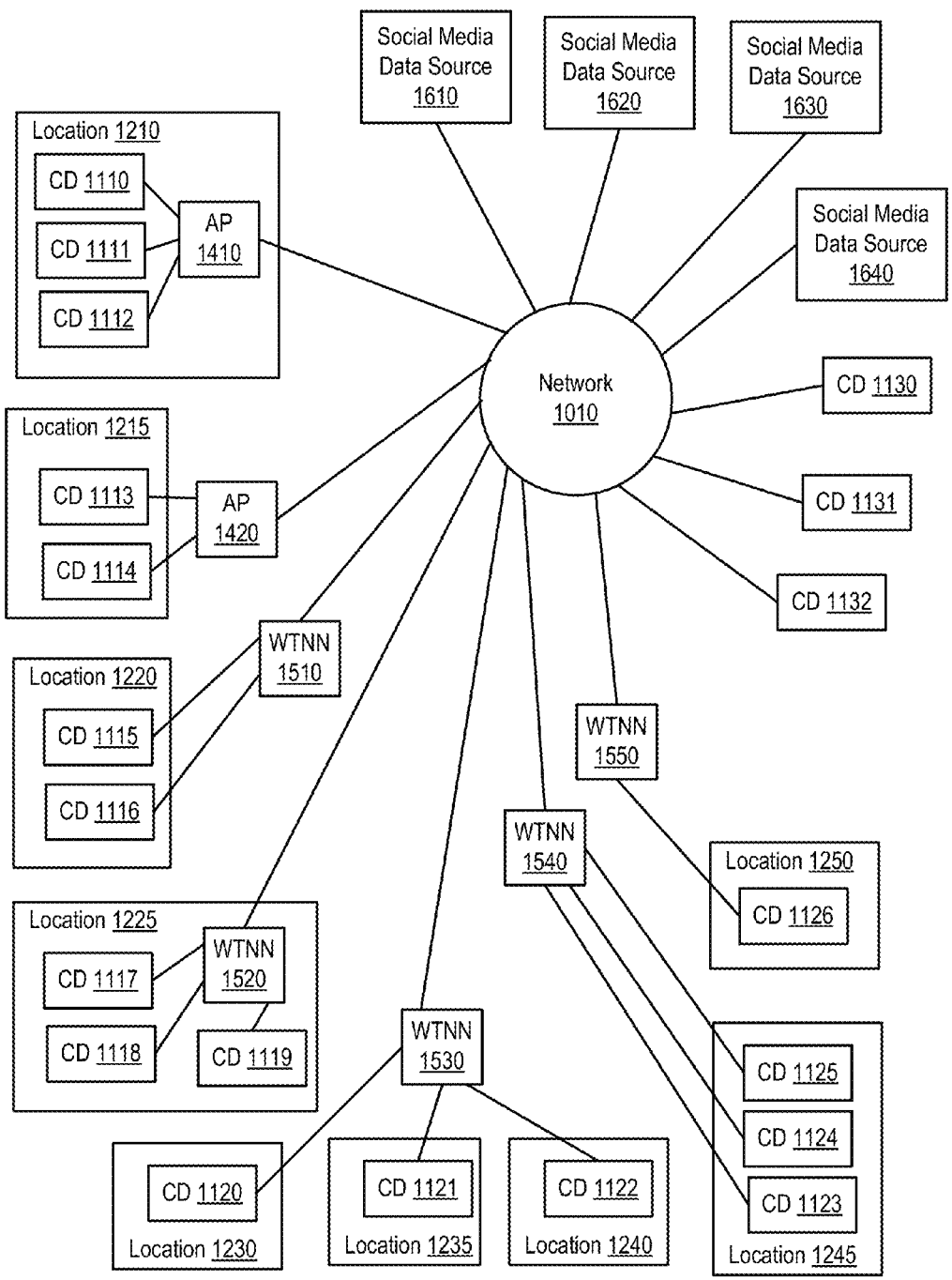
FIG. 1 provides a block diagram of one or more communications systems, according to one or more embodiments.

While one or more embodiments may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of this disclosure.

DETAILED DESCRIPTION

In one or more embodiments, systems, methods, and/or processes described herein can provide one or more interfaces that can search and/or filter data of social networks (e.g., Facebook, Twitter, YouTube, Weibo, a blog, a wiki, Foursquare, Instagram, Flickr, Vimeo, Yelp, etc.) with respect to one or more of a geospatial references, location-based contexts, and/or map-based references. For example, user input can be received that can move a searchable eye of variable dimension about a map interface to denote a search region, and data associated with one or more social networks can be searched and/or filtered with respect to the denoted search region. For instance, one or more social networks can be queried with one or more search and/or filter parameters and one or more geographic locations associated with the denoted search region, and one or more results can be received from the one or more social networks, where the results can be based on the one or more search and/or filter parameters and one or more geographic locations associated with the denoted search region.

In one or more embodiments, subject-related groups can be defined and/or categorized by one or more of discussion and affinity criteria, among others. For example, one or more of time/subject phases of dominance by individuals, individual participant relationship to one or more groups, and individuals to their respective network of contacts, among others, can be mapped.

In one or more embodiments, queries can be saved with their geospatial references and their search and/or filter parameters. For example, one or more saved queries can continue to run and/or execute over one or more periods of time transpiring. In one or more embodiments, queries can be saved with their geospatial references and their search and/or filter parameters. For example, one or more saved queries can continue to run and/or execute over one or more periods of time transpiring. In one or more embodiments, methods, processes, and/or systems can query a social network with one or more search and/or filter parameters and one or more geographic locations associated with a denoted search region. For example, the social network can be queried via an application programming interface (API). For instance, the social network can provide the API. In one or more embodiments, the social network can be queried via a network (e.g., a public network, a private network, etc.), and one or more results of the query can be received via the network. In one example, the API can include a hypertext transfer protocol (HTTP) interface, and the social network can be queried via the HTTP interface. In a second example, the API can include a hypertext transfer protocol secure (HTTPS) interface, and the social network can be queried via the HTTPS interface. In another example, the API can be utilized with one or more secure communication methods, processes, and/or systems. For instance, the API can be utilized with and/or via one or more of a virtual private network, a secure tunnel, a secure socket layer (SSL), and a transport layer security (TLS) protocol, among others.

In one or more embodiments, the one or more results of the query of the social network can be provided to a user as the one or more results become available from the social network. For example, the one or more results can be provided to a user via a user interface (e.g., a graphical user interface) as the one or more results become available from the social network.

In one or more embodiments, the one or more results of a query of the social network can be received over one or more periods of time transpiring. For example, one or more queries can be provided to a social media network data source (e.g., a data source that can store social media network data), the one or more queries can be saved (e.g., stored) with their geospatial references and their search and/or filter parameters, an amount of time can transpire, the one or more queries can be retrieved (e.g., retrieved from storage), the one or more queries can be provided (again, in a repeated fashion, etc.) to the social media network data source, and one or more search results can be received from the social media network data source. For instance, running and/or executing one or more saved queries can provide continual and/or periodic reporting.

In one or more embodiments, one or more methods, processes, and/or systems, described herein, can utilize one or more event-driven one social network media data source methods, processes, and/or systems. In one example, one or more events can be generated (e.g., a data ready event, a timer event, a timeout event, a periodic timer event, a processing system ready event, a data send event, etc.), and one or more event handlers can perform one or more methods and/or processes in response to the one or more events. In one instance, the one or more event handlers can receive and/or process data associated with the one or more events. In a second instance, the one or more event handlers can provide data in response to the one or more events. In another instance, the one or more event handlers can generate one or more additional events in response to the one or more events.

In one example, a data ready event can be generated when data has been received from a social media network data source, and a data ready event handler can process the data received from the social media network data source. In a second example, a timeout event can be generated, and a timeout event handler can retrieve (e.g., retrieve from storage) one or more queries saved queries and can provide the one or more queries saved queries to a social media network data source. In one instance, a timer can be set with an amount of time to transpire, and the timeout event can be generated in response to the amount of time transpiring. In another instance, a timer can be set with a time (e.g., 10:30, 16:45 on 11 Dec. 2012, 23:02 on 26 July, etc.), and the timeout event can be generated in response to the time occurring.

In another example, a periodic timeout event can be generated, and a periodic timeout event handler can retrieve (e.g., retrieve from storage) one or more queries saved queries and can provide the one or more queries saved queries to a social media network data source. In one instance, a periodic timer can be set with an amount of time to transpire, and the periodic timeout event can be generated in response to the amount of time transpiring. In one or more embodiments, the periodic timeout event can be generated, repeatedly, in response to each repetition of the amount of time transpiring. For, one or more methods, processes, and/or systems, described herein, can query a social media data source at a time interval.

In one or more embodiments, one or more methods, processes, and/or systems, described herein, can query the social network in a continuous fashion. For example, the social network can be queried until one or more results are received or until an amount of time has transpired. For instance, one or more methods, processes, and/or systems, described herein, can query the social network in a background process and/or in an automated batch. For example, one or more saved queries can continue to run and/or execute over one or more periods of time transpiring. For instance, running and/or executing one or more saved queries can provide continual and/or periodic reporting.

In one or more embodiments, methods, processes, and/or systems, described herein, can provide and/or implement one or more user interfaces. For example, the one or more user interfaces can provide one or more of social network query results, statistical analyses of data from the social network query results, one or more charts (e.g., a chart illustrating a number of results returned vs. each time the query was performed), a review of results determined and content that was saved, and/or some or all of the social network query results layered over a map, among others. In one or more embodiments, one or more of social network query results and statistical analyses of data from the social network query results, among others, can be utilized in training a neural network. For example, trainable data sets can be utilized for pattern initial guidance. For instance, one or more methods and/or processes can be trained from data sets and can automatically acquire an artificial intelligence to increase one or more of group, individual, and intent mapping aptitude over a period of time.

In one or more embodiments, one or more methods, processes, and/or systems, described herein, can query one or more social media data sources for one or more geographic context regions. For example, one or more social media data sources can group one or more users via one or more geographic context regions. In one or more embodiments, a search region can be expanded to query one or more social media data sources for one or more geographic context regions. For example, a search region can be expanded to determine one or more geographic context regions that intersect, in whole or in part, the search region.

In one or more embodiments, determining one or more geographic context regions that intersect a search region can be utilized to determine and/or discover additional users of one or more social media data sources that may not be provided via querying the one or more social media data sources based on the search region. For example, querying the one or more social media data sources based on the search region may only provide users that are associated with a single geographic context region. For instance, querying the one or more social media data sources based on one or more geographic context regions that intersect a search region can provide all, if not most, users that are associated with the search region.

Turning now to FIG. 1, one or more network systems are illustrated, according to one or more embodiments. As shown, one or more social media data sources 1610-1640 can be coupled to a network 1010. In one or more embodiments, a social media data source (which can also be referred to as a social network media data source) can include a social media service and/or one or more computer systems that are operated and/or controlled by the social media service. For example, the social media service can provide and/or include one or more web-based interfaces (e.g., one or more websites and/or one or more network-based application programming interfaces) and/or mobile-based technologies and/or services that can facilitate and/or implement communications and/or interactive dialogues among related individuals, organizations, and/or communities, among others. For instance, the social media service can provide and/or implement Internet-based applications (e.g., websites, network-based programming interfaces, etc.) that can facilitate and/or provide a creation and/or an exchange of user input (e.g., user-generated data, user-provided content, etc.). In one example, social media data sources 1610-1640 can include Facebook, Twitter, YouTube, and Weibo. In another example, the social media data sources can include MySpace, Friendster, a blog, a wiki, Foursquare, Instagram, Flickr, Vimeo, and Yelp, among others.

In one or more embodiments, one or more of social media data sources 1610-1640 can provide application programming interfaces that provide functionalities that can receive one or more queries and can provide social media data corresponding to and/or associated with the one or more queries. For example, social media data source 1610 can receive a query associated with one or more of a word, a phrase, a user profile, a portion of a user profile, a regular expression, a natural language filter, a grammar (e.g., a set of formation rules for strings in a language, a context-free grammar, a regular grammar, a tree-adjoining grammar, an affix grammar, an attribute grammar, an adaptive grammar, an ambiguous grammar, a categorical grammar, etc.), a social group, an organization, a user identification, and/or a location, among others, and can provide social media data that is associated with and/or corresponds to at least one of the word, the phrase, the grammar, the regular expression, the user profile, the portion of the user profile, the social group, the organization, the user identification, and the location. For instance, social media data source 1610 can receive a query associated with one or more locations and provide the location-based social media data matching that query via network 1010. In one or more embodiments, a user profile can include one or more of a user name, a user identification, a mobile telephone number, an email address, a physical address, an occupation, a gender, a marital status, a past purchase, an interest, a past transaction, a shoe size, an age, one or more clothing sizes, a political affiliation, a monthly include, a yearly income, an employment status, a credit history, a credit rating, an eye color, a hair color, a music genre, and a membership, among others.

As illustrated, computing devices (CDs) 1110-1112 and an access point (AP) 1410 can be at and/or associated with a location 1210, and CDs 1110-1112 can be coupled to AP 1410 that can be coupled to network 1010. In one or more embodiments, AP 1410 can communicate with one or more computing devices in one or more of a wired fashion and a wireless fashion. In one example, AP 1410 can communicate with one or more of CDs 1110-1112 in a wired fashion. For instance, AP 1410 can communicate with CDs 1110-1112 via one or more of wired Ethernet, fiber optics, wired universal serial bus (USB), digital subscriber loop (DSL), and coaxial cable (e.g., cable TV), among others.

In another example, AP 1410 can communicate with one or more of CDs 1110-1112 in a wireless fashion. For instance, AP 1410 can communicate with CDs 1110-1112 via one or more of wireless Ethernet (e.g., WiFi), Institute of Electrical and Electronics Engineers (IEEE) 802.11, IEEE 802.16, WiMAX, Bluetooth, IEEE 802.15, ZigBee, Z-Wave, ultra wideband, IEEE 802.15.4, and wireless USB, among others. In one or more embodiments, an AP can include a transceiver to communicate with computing devices utilizing one or more wireless methods, processes, wireless spectrums (e.g., frequency ranges), protocols, and/or systems. For example, an AP can communicate with computing devices utilizing ISM (industrial, scientific and medical) bands. For instance, an ISM band can include a frequency range of 6.765-6.795 Mhz, 433.05-434.79 Mhz, 902-928 Mhz, 2.4-2.5 Ghz, 5.725-5.875 Ghz, or 24.0-24.25 Ghz, among others.

As shown, CDs 1113 and 1114 can be at and/or associated with a location 1215, CDs 1113 and 1114 can be coupled to an AP 1420 that can be coupled to network 1010. In one or more embodiments, AP 1420 can include one or more structures and/or functionalities described with reference to AP 1410. For example, AP 1420 can communicate with one or more computing devices in one or more of a wired fashion and a wireless fashion. As illustrated, AP 1420 may not be at and/or associated with a location 1215, according to one or more embodiments.

As shown, CDs 1115 and 1116 can be at and/or associated with a location 1220, and CDs 1115 and 1116 can be coupled to a wireless telephone network node (WTNN) 1510 that can be coupled to network 1010. In one example, WTNN 1510 can include one or more of a base station subsystem (BSS), a base station controller (BSC), and a base transceiver station (BTS) that can be coupled to network 1010. In a second example, WTNN 1510 can include one or more of a radio network controller (RNC) and a Node B. For instance, a Node B can include and/or denote a BTS of a universal mobile telecommunications system (UMTS) and can include one or more transmitters, one or more receivers, one or more transceivers, and/or one or more antennas. In another example, a WTNN can include a satellite that can orbit a planet (e.g., Earth) and can be wirelessly coupled to network 1010. For instance, the WTNN can orbit the planet in a low planetary orbit (e.g., a low Earth orbit), a medium planetary orbit (e.g., a medium Earth orbit), a geostationary orbit, a high planetary orbit (e.g., a high Earth orbit), a semi-synchronous orbit, or a geosynchronous orbit, among others.

In one or more embodiments, a WTNN can communicate with one or more computing devices via one or more protocols such as one or more of wideband code division multiple access (WCDMA), time division synchronous code division multiple access (TD-SCDMA), code division multiple access (CDMA), time division multiple access (TDMA), GSM (global system for mobile communications), long term evolution (LTE), general packet radio service (GPRS), enhanced GPRS (EGPRS), frequency division multiple access (FDMA), and enhanced data rates for GSM evolution (EDGE), among others. In one or more embodiments, a WTNN can include one or more transmitters, one or more receivers, one or more transceivers, one or more antennas, and/or one or more cryptography devices that can be used to wirelessly communicate with one or more computing devices. In one example, the one or more antennas of the WTNN can be mounted on a mast, on a tower (e.g., a cellular telephone communications tower), on a side of a structure (e.g., a building, a parking garage, a lamp post, etc.), and/or on a roof of a building, among others.

As illustrated, CD 1117-1119 and a WTNN 1520 can be at and/or associated with a location 1225, and CDs 1117-1119 can be coupled to WTNN 1520 that can be coupled to network 1010. In one or more embodiments, WTNN 1520 can include one or more structures and/or functionalities described with reference to WTNN 1510. As shown, CDs 1120-1122 can be at and/or associated with respective locations 1230-1240, and CDs 1120-1122 can be coupled to a WTNN 1530 that can be coupled to network 1010. In one or more embodiments, WTNN 1530 can include one or more structures and/or functionalities described with reference to WTNN 1510. As shown, WTNN 1530 may not be at and/or associated with one or more of locations 1230-1240, according to one or more embodiments.

As illustrated, CD 1123-1125 can be at and/or associated with a location 1245, and CDs 1123-1125 can be coupled to WTNN 1540 that can be coupled to network 1010. In one or more embodiments, WTNN 1540 can include one or more structures and/or functionalities described with reference to WTNN 1510. As shown, WTNN 1540 may not be at and/or associated with location 1245, according to one or more embodiments. As illustrated, a computing device (CD) 1126 can be at and/or associated with a location 1250, and CD 1126 can be coupled to a WTNN 1550 that can be coupled to network 1010. In one or more embodiments, WTNN 1550 can include one or more structures and/or functionalities described with reference to WTNN 1510. As shown, WTNN 1550 may not be at and/or associated with location 1250, according to one or more embodiments. As illustrated, one or more CDs 1130-1132 can be coupled to network 1010.

In one or more embodiments, network 1010 and/or network 1014 can include a wired network, a wireless network or a combination of wired and wireless networks. Network 1010 and/or network 1014 can include and/or be coupled to various types of communications networks, such as a public switched telephone network (PSTN), an Internet, a wide area network (WAN) (e.g., a private WAN, a corporate WAN, a public WAN, etc.), a local area network (LAN), etc. In one or more embodiments, NMD 1020 can be coupled to a PSTN, e.g., Ethernet cable and DSL; a cable (television) based network; a satellite-based system; and/or a fiber based network; among others. In one or more embodiments, network 1010 can include one or more wireless networks, e.g., based on IEEE 802.11 and/or IEEE 802.16.

In one or more embodiments, network 1010 can be or include a communications network. In one example, network 1010 can be or include multiple networks and/or can be coupled to one or more other networks. For instance, network 1010 can be, include, or form part of a WAN. For instance, the WAN can include one or more of a private WAN, a corporate WAN, and a public WAN (e.g., an Internet), among others. In another example, network 1010 can be or include a telephone network. In one instance, network 1010 can be or include a PSTN. In a second instance, network 1010 can be or include a wired telephone network. In another instance, network 1010 can be or include a wireless telephone network (e.g., a cellular telephone network, a satellite telephone network, etc.).

In one or more embodiments, network 1010 can include and/or be coupled to various types of communications networks. For example, network 1010 can include and/or be coupled to a PSTN, an Internet, a WAN (e.g., a private WAN, a corporate WAN, a public WAN, etc.), and/or a LAN, among others. In one or more embodiments, network 1010 can include a wired network, a wireless network or a combination of wired and wireless networks. In one example, network 1010 can include and/or be coupled to coupled to a wired PSTN, a DSL network, a cable (television) based network, a satellite-based system and/or network, and/or a fiber based network; among others. In another example, network 1010 can include and/or be coupled to one or more wireless networks, e.g., based on IEEE 802.11, based on IEEE 802.16, based on a wireless PSTN, based on a wireless telecommunications network, etc.

In one or more embodiments, a network system can be or include a communication system. For example, a network system can be operated by a network provider. For instance, a first network system can be operated by a first network provider (e.g., AT&T, T-Mobile, Iridium Communications, Verizon Wireless, Globalstar, etc.), and a second network system can be operated by a second network provider (e.g., Time-Warner Cable, Wayport, Boingo, Qwest, CLEAR, Grande Communications, Cox, EarthLink, etc.).

In one or more embodiments, one or more of CDs 1110-1126 can be or include any of various types of devices, including a computer system, such as a desktop computer system, a portable computer, a laptop computer system, a personal digital assistant (PDA), a smart phone, a wireless telephone (e.g., a cellular telephone, a satellite telephone, etc.), a digital music player, a tablet computing device, a wearable computing device, a communications device, or other wired or wireless device. In one example, a first user can utilize CD 1110 at location 1210. For instance, CD 1110 can be or include a laptop computing device. In a second example, a second user can utilize CD 1111 at location 1210. For instance, CD 1111 can be or include a tablet computing device. In a third example, a third user can utilize CD 1113 at location 1215. For instance, CD 1113 can be or include a personal digital assistant. In another example, a fourth user can utilize CD 1115 at location 1220. For instance, CD 1115 can be or include a wireless telephone.

In one or more embodiments, respective users of CDs 1110, 1111, 1113, and 1115, at and/or associated with respective locations, can provide data to one or more social media services, where the user-provided data can be associated with and/or correspond to the respective locations. In one example, the first user can utilize CD 1110 to update a status (e.g., a personal status) on a first social media service (e.g., associated with social media data source 1610) such that the updated status corresponds to a location of CD 1110. For instance, the updated status and information associated with location 1210 can be stored by first social media service such that the updated status is associated with location data such that the updated status corresponds to location 1210. In a second example, the second user can utilize CD 1111 to upload a picture and/or a motion picture (e.g., a video) to a second social media service (e.g., associated with social media data source 1620). For instance, the picture and/or the motion picture and information associated with location 1210 can be stored by second social media service such that the picture and/or the motion picture corresponds to location 1210. In a third example, the third user can utilize CD 1113 to rate and/or review a venue (e.g., a restaurant, a coffee shop, a movie theatre, a car wash, etc.) on a third social media service (e.g., associated with social media data source 1630). For instance, the rating and/or the review and information associated with location 1215 can be stored by third social media service such that the rating and/or the review correspond to location 1215.

In another example, the fourth user can utilize CD 1115 to update an action and/or activity on a fourth social media service (e.g., associated with social media data source 1640). In one instance, the action and/or the activity and information associated with location 1220 can be stored by the fourth social media service such that the action and/or the activity corresponds to location 1220. In another instance, the action and/or the activity can be related to the fourth user (e.g., entering a football stadium) or can be related to actions and/or activities of others in the vicinity of location 1220 (e.g., gunshot(s) fired, car crash, a parade, etc.). In yet another instance, the action and/or the activity can be related to the environment in the vicinity of location 1220 (e.g., building fire, brush fire, gas leak, explosion, lightening storm, earthquake, etc.).

In one or more embodiments, a location (e.g., a location of locations 1210-1250), associated with and/or corresponding to a computing device, can be determined. For example, a location, described herein, can be or include a geographical location. For instance, a location (e.g., a location of locations 1210-1250) can include one or more of a street number, a street, a zip code, a city, a state, a country, a unit identifier (e.g., a suite identifier, a condominium identifier, a hospital room identifier, an apartment identifier, a gate identifier of an airport, an airport identifier, etc.), a cell identification (cell ID or CID associated with a cellular telephone network), latitude information, longitude information, and altitude information, among others. In one or more embodiments, a location can be, include, or be associated with one or more of a voting district, a congressional district, a school district, a school, a campus, a dormitory, an oil pipeline, a sports complex, a police precinct, a piece of real estate, a neighborhood, a borrow, a city, a town, a commercial office building, a floor of a building, a factory, a refinery, a storage facility, a power station, a power substation, and a military installation, among others.

In one or more embodiments, a location (e.g., a location of locations 1210-1250) can be determined based on a location of an AP communicating with a computing device. For example, one or more of CDs 1110-1112 can communicate with AP 1410, which is associated with and/or corresponding to location 1210, and can be determined to be at and/or associated with location 1210. In one or more embodiments, a location (e.g., a location of locations 1210-1250) can be determined based on a location of a WTNN communicating with a computing device. For example, one or more of CDs 1117-1119 can communicate with WTNN 1520, which is associated with and/or corresponding to location 1225, and can be determined to be at and/or associated with location 1225.

In one or more embodiments, a location (e.g., a location of locations 1210-1250) can be determined based on locations of multiple wireless telephone network nodes (WTNNs) communicating or being capable of communicating with a computing device. For example, CD 1122 can communicate or can be capable of communicating with two or more of WTNNs 1530-1550, and a location of CD 1122 (e.g., location 1240) can be determined based on two or more of WTNNs 1530-1550 and their locations. In one instance, a location of a computing device can be determined via multilateration which is a navigation technique that utilizes measurements of differences in distances to two or more WTNNs, at previously determined or known locations, that broadcast one or more signals at previously determined or known times. In a second instance, a location of a computing device can be determined via trilateration which is a navigation technique that utilizes distances or absolute measurements of time-of-flight from three or more WTNNs. In another, a location of a computing device can be determined via triangulation which is a navigation technique that utilizes measurements of absolute angles. In one or more embodiments, a computing device and/or a network operator can utilized multiple WTNNs in determining a location of the computing device.

In one or more embodiments, a location of a computing device is determined utilizing data from a positioning device and/or mechanism. For example, the computing device can include a global positioning system (GPS) device and/or mechanism, and the computing device can communicate its location information, from the GPS device and/or mechanism, to a social media data source. In one or more embodiments, a location of a computing device can be determined utilizing a network address utilized by the computing device. For example, the network address can include an Internet protocol (IP) address or other address utilized by the computing device and/or an IP address or other address of a gateway associated with the computing device. In one instance, a database can include multiple IP addresses that correspond to multiple locations, and the database can be queried with an IP address and can provide a location based on the IP address. In another instance, the network address can be or include a network address of a communication system.

In one or more embodiments, a computing device that is communicating with a social network can provide a location of the computing device to the social network. In one example, the computing device can provide latitude and longitude information, from a GPS device and/or mechanism, to the social network. In another example, the computing device can provide one or more of street number information, street information, zip code information, city information, state information, and country information, among others, to the social network.

In one or more embodiments, user-provided data (e.g., user-provided content, user input, user-provided pictures, user-provided motion pictures, user-provided videos, communications and/or interactive dialogues among related individuals, organizations, and/or communities, user status updates, posts to one or more social network services, one or more blog entries, etc.) can be correlated and/or associated with a location of a computing device, utilized by a user, that provides the user-provided data to a social media service via a network. In one example, first user input can be correlated and/or associated with a first location of a first computing device, utilized by a first user, that provides the first user input to a first social media service via network 1010. For instance, the first user input can be correlated and/or associated with location 1210 of CD 1110, utilized by the first user, that provides the first user input to a first social media service via network 1010.

In a second example, second user input can be correlated and/or associated with a second location of a second computing device, utilized by a second user, that provides the second user input to a second social media service via network 1010. For instance, the second user input can be correlated and/or associated with location 1215 of CD 1113, utilized by the second user, that provides the second user input to a second social media service via network 1010. In a third example, third user input can be correlated and/or associated with a third location of a third computing device, utilized by a third user, that provides the third user input to a third social media service via network 1010. For instance, the third user input can be correlated and/or associated with location 1245 of CD 1123, utilized by the third user, that provides the third user input to a third social media service via network 1010.

In a fourth example, fourth user input can be correlated and/or associated with the first location of a fourth computing device, utilized by a fourth user, that provides the fourth user input to a fourth social media service via network 1010. For instance, the fourth user input can be correlated and/or associated with location 1210 of CD 1111, utilized by the fourth user, that provides the fourth user input to a fourth social media service via network 1010. In a fifth example, fifth user input can be correlated and/or associated with a fifth location of a fifth computing device, utilized by a fifth user, that provides the fifth user input to the first social media service via network 1010. For instance, the fifth user input can be correlated and/or associated with location 1240 of CD 1122, utilized by the fifth user, that provides the fifth user input to a fifth social media service via network 1010. In a sixth example, sixth user input can be correlated and/or associated with the second location of a sixth computing device, utilized by a sixth user, that provides the sixth user input to the second social media service via network 1010. For instance, the sixth user input can be correlated and/or associated with location 1215 of CD 1114, utilized by the sixth user, that provides the sixth user input to a sixth social media service via network 1010.

In one or more embodiments, user input correlated and/or associated with a location of a computing device can be provided to a social media service via one or more of a web interface, a post (e.g., a HTTP POST), a get (e.g., a HTTP GET), a smart phone application, a tablet application, a digital music player application, a personal digital assistant application, an application for a personal computer (e.g., a desktop computer, a notebook computer, etc.), and an application for a virtual machine, among others.

Figure 2:
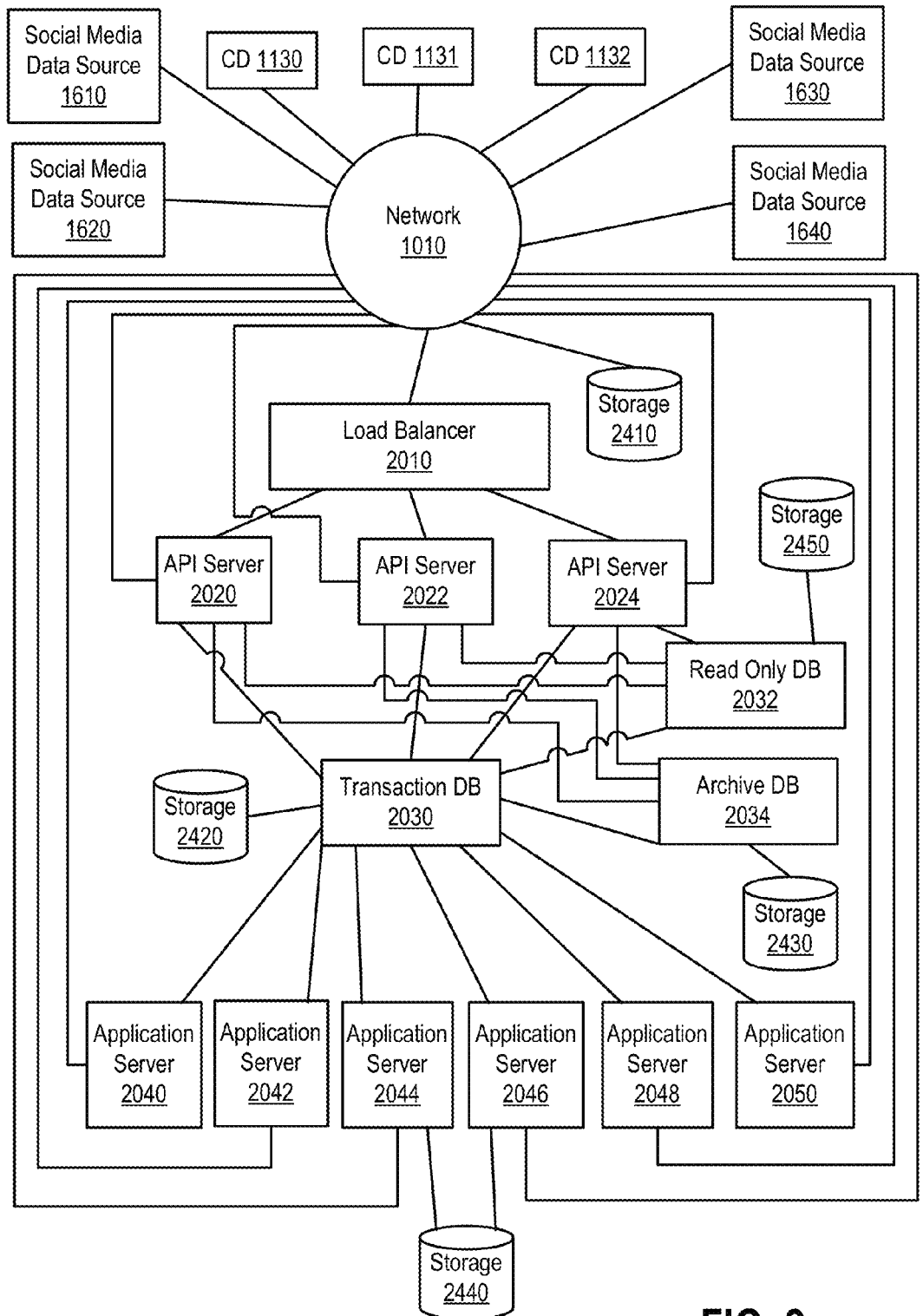
FIG. 2 provides a block diagram of a social media query system, according to one or more embodiments.

Turning now to FIG. 2, a social media query system is illustrated, according to one or more embodiments. As shown, one or more of CDs 1130-1132 and/or one or more of social media data sources 1610-1640 can be coupled to network 1010. In one or more embodiments, one or more of CDs 1130-1132 can be or include one or more clients of the social media query system. For example, one or more of CDs 1130-1132 can provide one or more queries to one or more API servers 2020-2024 via network 1010 and via a load balancer 2010. For instance, load balancer 2010 can distribute queries between or among two or more API servers in accordance with one or more load balancing methods and/or processes.

As illustrated, API servers 2020-2024 can be coupled to network 1010. In one or more embodiments, one or more API servers 2020-2024 can query one or more social media data sources 1610-1640. For example, one or more API servers 2020-2024 can receive one or more live queries from one or more of CDs 1130-1132 and can query one or more social media data sources 1610-1640, via network 1010, to provide one or more responses to the live queries. For instance, a live query can include a query for data that has not been archived.

In one or more embodiments, one or more API servers 2020-2024 can utilize one or more network monitors and/or packet analyzers (not shown) to monitor network traffic on network 1010 and capture network packets en route to one or more social media data sources 1610-1640 including information related to a query. For example, one or more API servers 2020-2024 can receive one or more queries from one or more of CDs 1130-1132 and intercept network packets destined for one or more social media data sources 1610-1640 via network 1010 to provide one or more responses to the queries based on content of the captured network packets.

In one or more embodiments, data provided to the social media services can be associated with and/or correspond to respective locations of computing devices that provided the data, and API servers 2020-2024 can query the one or more social media services to determine information associated with and/or corresponding to the data provided to the social media services and respective locations of the computing devices that provided the data. In one example, API server 2020 can provide, to social media data source 1610, a first query associated with one or more of a first word, first words, a first phrase, a first user profile, a portion of the first user profile, a first grammar, a first regular expression, a first social group, a first organization, a first user identification, and a first location, among others, and receive social media data that is associated with and/or corresponds to at least one of the first word, the first words, the first phrase, the first user profile, the portion of the first user profile, the first grammar, the first regular expression, the first social group, the first organization, the first user identification, and the first location. For instance, API server 2020 can provide the first query to social media data source 1610 via network 1010 and can receive the first social media data from social media data source 1610 via network 1010.

In a second example, API server 2022 can provide, to social media data source 1620, a second query associated with one or more of a second word, second words, a second phrase, a second user profile, a portion of the second user profile, a second grammar, a second regular expression, a second social group, a second organization, a second user identification, and a second location, among others, and receive second social media data that is associated with and/or corresponds to at least one of the second word, the second words, the second phrase, the second user profile, the portion of the second user profile, the second grammar, the second regular expression, the second social group, the second organization, the second user identification, and the second location. For instance, API server 2022 can provide the second query to social media data source 1620 via network 1010 and can receive the second social media data from social media data source 1620 via network 1010.

In another example, API server 2024 can provide, to social media data source 1630, a third query associated with one or more of a third word, third words, a third phrase, a third user profile, a third portion of the third user profile, a third grammar, a third regular expression, a third social group, a third organization, a third user identification, and a third location, among others, and receive third social media data that is associated with and/or corresponds to at least one of the third word, the third words, the third phrase, the third user profile, the portion of the third user profile, the third grammar, the third regular expression, the third social group, the third organization, the third user identification, and the third location. For instance, API server 2024 can provide the third query to social media data source 1630 via network 1010 and can receive the third social media data from social media data source 1630 via network 1010.

In one or more embodiments, social media data from a social media data source can be stored in a database (DB). For example, one or more of the first social media data from social media data source 1610, the second social media data from social media data source 1620, and the third social media data from social media data source 1630 can be stored in a transactional DB 2030. In one or more embodiments, transactional DB 2030 can provide social media data from a social media data source to one or more of a read only DB 2032 and an archive DB 2034. In one example, read only DB 2032 can be utilized for queries associated with and/or corresponding to data that has been received from a social media data source. For instance, read only DB 2032 can be utilized to off-load queries from transaction DB 2030. In a second example, archive DB 2034 can be utilized for long-term storage of queries associated with and/or corresponding to data that has been received from a social media data source. In another example, archive DB 2034 can be utilized for queries over a period of time.

In one or more embodiments, one or more of transactional DB 2030, read only DB 2032, and archive DB 2034 can include and/or be implemented via multiple computing devices and/or multiple databases. In one example, transactional DB 2030 can include at least one computer system for each API server coupled to transactional DB 2030. In another example, one or more of read only DB 2032 and archive DB 2034 can include multiple computing devices to process data in a parallel fashion. For instance, a DB can divide a data processing problem (e.g., a query), distribute portions of the data and/or portions the problem to multiple computing devices, and combine results from the multiple computing devices that were provided the portions of the data and/or the portions the problem.

In one or more embodiments, a database can include a relational database management system (RDBMS) that can be accessed by one or more computer systems. For example, the RDBMS can include an Oracle database, a Microsoft SQL Server database, a MySQL database, a PostgreSQL database, etc. In one or more embodiments, a database can include an object oriented database. For example, the object oriented database can include an Informix database, an Objectivity/DB database, a FastObjects database, a JADE database, a VelocityDB database, an ObjectDB database, etc. In one or more embodiments, a database can include a combination of a RDBMS and an object oriented database system.

As illustrated, transactional DB 2030 can be coupled to one or more of API servers 2020-2024, read only DB 2032, archive DB 2034, and application servers 2040-250. In one or more embodiments, one or more of applications servers 2040-2050 can process and/or issue one or more queries to one or more social media data sources. For example, applications servers 2040-2050 can process and/or issue one or more queries to social media data sources over a period of time. In one or more embodiments, one or more of applications servers 2040-2050 can receive, process, analyze and/or present one or more results of one or more queries to one or more social media data sources.

As shown, a storage 2410 can be coupled to network 2410. In one or more embodiments, one or more of API servers 2020-2024, databases 2030-2034, and application servers 2040-2050 can utilize storage 2420 via network 1010. As illustrated, storages 2420, 2430, and 2450 can be coupled to one or more transaction DB 2030, archive DB 2430, and read only DB 2032, respectively. In one or more embodiments, one or more of storages 2420, 2430, and 2450 can be coupled to a respective database via one or more of SATA (serial AT attachment), SAS (serial attached SCSI), and FCoE (fiber channel over Ethernet). For example, storage 2420 can be coupled to database 2030 via Ethernet. For instance, FCoE can map storage 2420 to database 2030 independent of an Ethernet forwarding scheme. In one or more embodiments, one or more of storages 2410-2450 can be, be included in, or include at least one of a network attached storage (NAS) and a storage area network (SAN), among others.

As illustrated, a storage 2440 can be coupled to one or more of applications servers 2044 and 2046. In one or more embodiments, one or more of storage 2440 can be coupled to one or more of application servers 2440 via one or more of SATA, SAS, and FCoE. For example, storage 2420 can be coupled to database 2030 via Ethernet.

In one or more embodiments, one or more of storages 2410-2450 can include one or more storage devices that can be utilized to store database data (e.g., tables, database schemes, etc.) and/or one or more queries of one or more social media data sources. For example, one or more of storages 2410-2450 can store one or more queries generated via one or more methods, processes and/or systems described herein. In one or more embodiments, one or more stored queries can be retrieved from one or more of storages 2410-2450.

Figure 3:
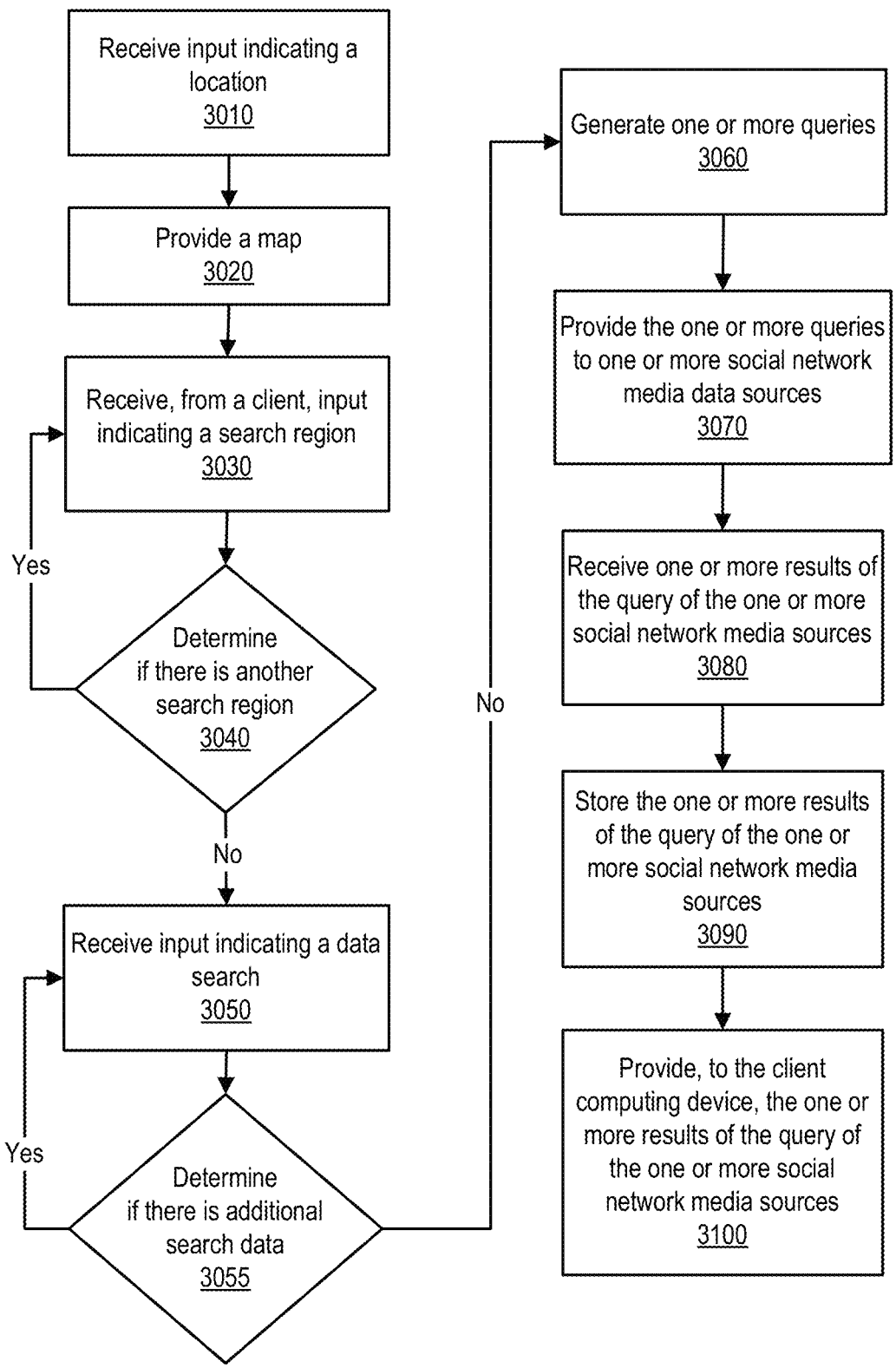
FIG. 3 provides a method of selecting a geographic area, according to one or more embodiments.

Turning now to FIG. 3, a method of selecting a geographic area is illustrated, according to one or more embodiments. At 3010, input indicating a location can be received. For example, an API server of API servers 2020-2024 can receive input indicating the location from a client (e.g., one of CDs 1130-1132) via network 1010. For instance, the location can include one or more of a coordinate (e.g., latitude, longitude, etc.), a city, a state, a zip code, and a country, among others. In one or more embodiments, the input can include at least one of user input and machine input (e.g., from a database system), among others. At 3020, a map can be provided. For example, an API server of API servers 2020-2024 can provide a map to the client. For instance, the map can include the location received at 3010.

Figure 4:
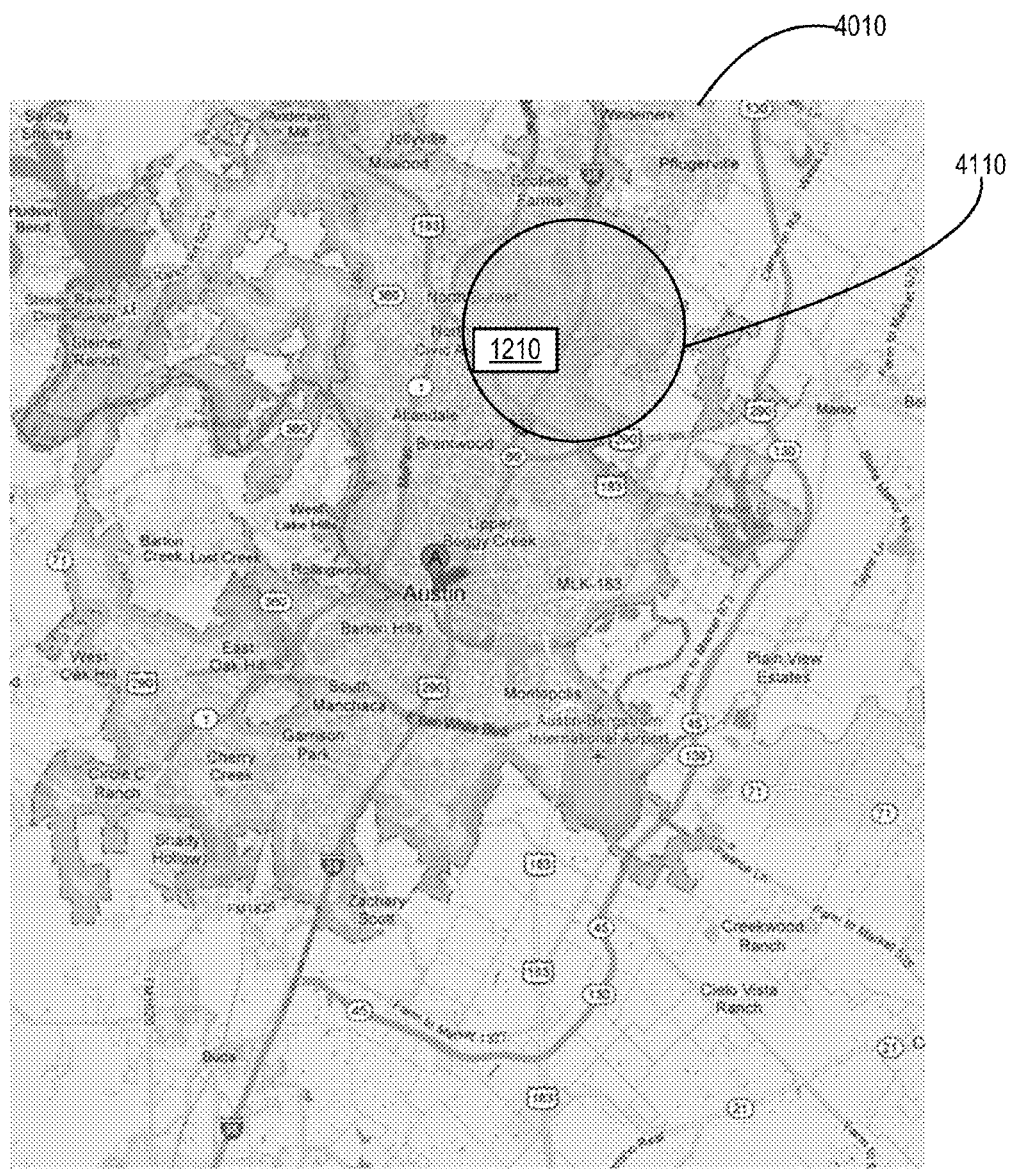
FIGS. 4-8 illustrate search regions of a map, according to one or more embodiments.

In one or more embodiments, the map can include the location, received at 3010, and one or more surrounding regions. For example, a map 4010 can include the location of Austin, Tex. and one or more surrounding regions as illustrated in FIG. 4. For instance, the client can display map 4010, via a display device and/or a graphical user interface (GUI), to a user. At 3030, input indicating a search region can be received. For example, an API server of API servers 2020-2024 can receive input indicating the search region from the client via network 1010. For instance, the user can select a search region 4110 of map 4010, and input indicating search region 4110 can be received from the client via network 1010. In one or more embodiments, the input indicating the search region received at 3030 can be associated with the location received via the input at 3010. As illustrated, search region 4110 can include location 1210.

At 3040, it can be determined if there is another search region. If there is another search region, the method can proceed to 3030. In one or more embodiments, a user of the client can utilized a GUI in selecting one or more search regions. In one instance, the client can receive user input via a pointing device (e.g., a mouse, a track pad, a track ball, a stylus, a finger, etc.), and data associated with and/or corresponding to the one or more selected search regions. In another instance, selected one or more search regions can be displayed, to a user, via a display device and/or a GUI.

Figure 5:
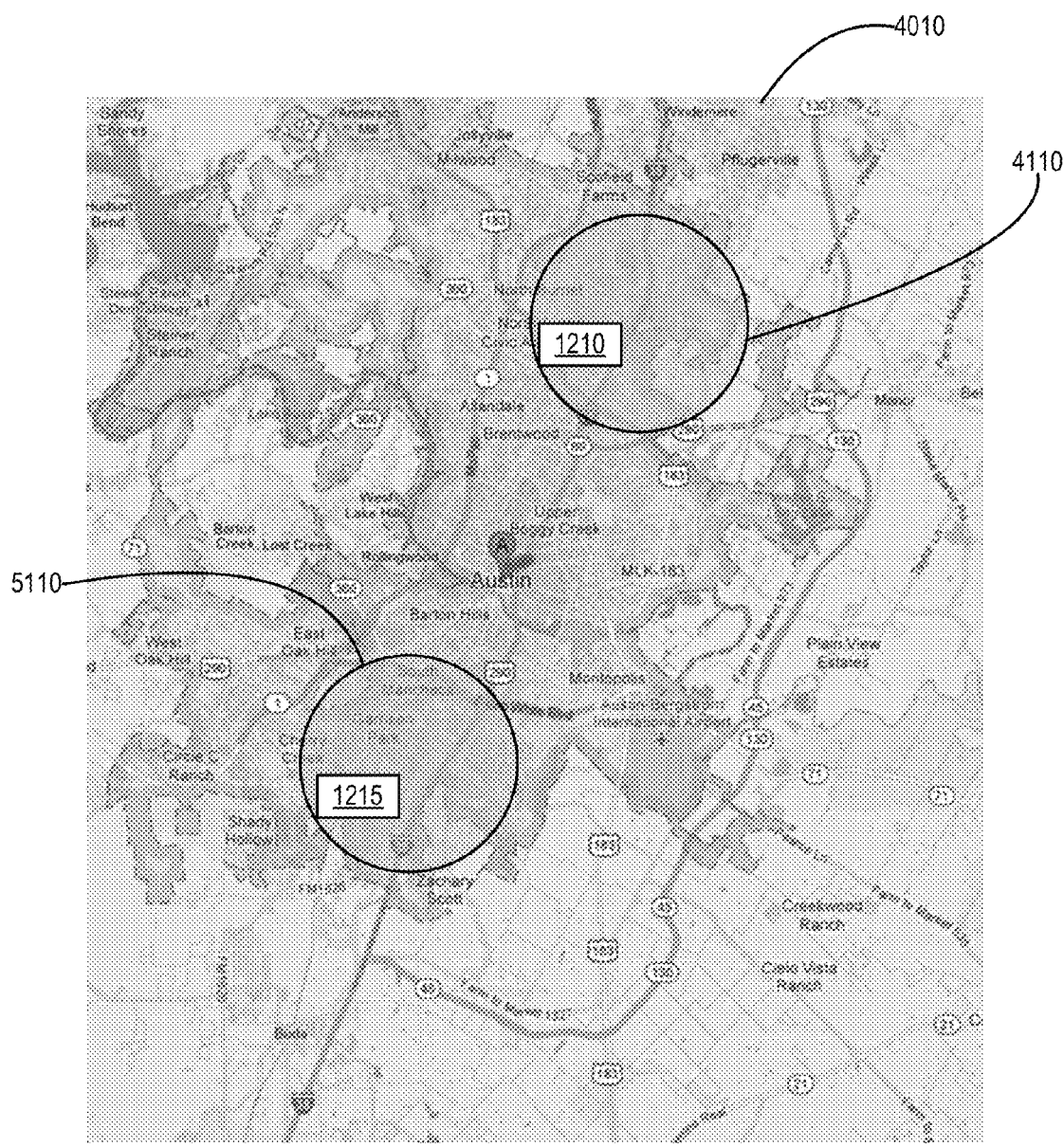
Figure 6:
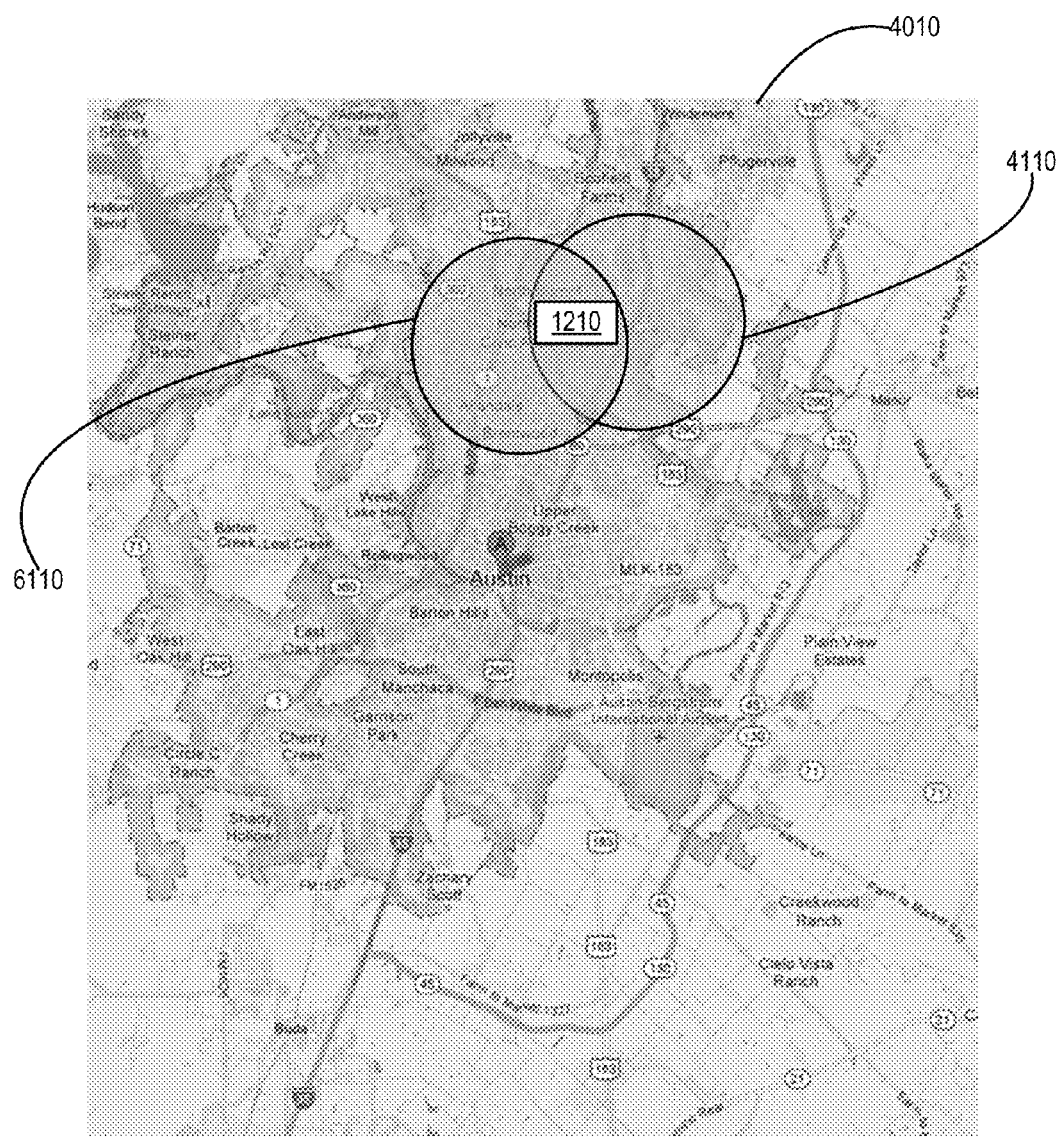
Figure 7:
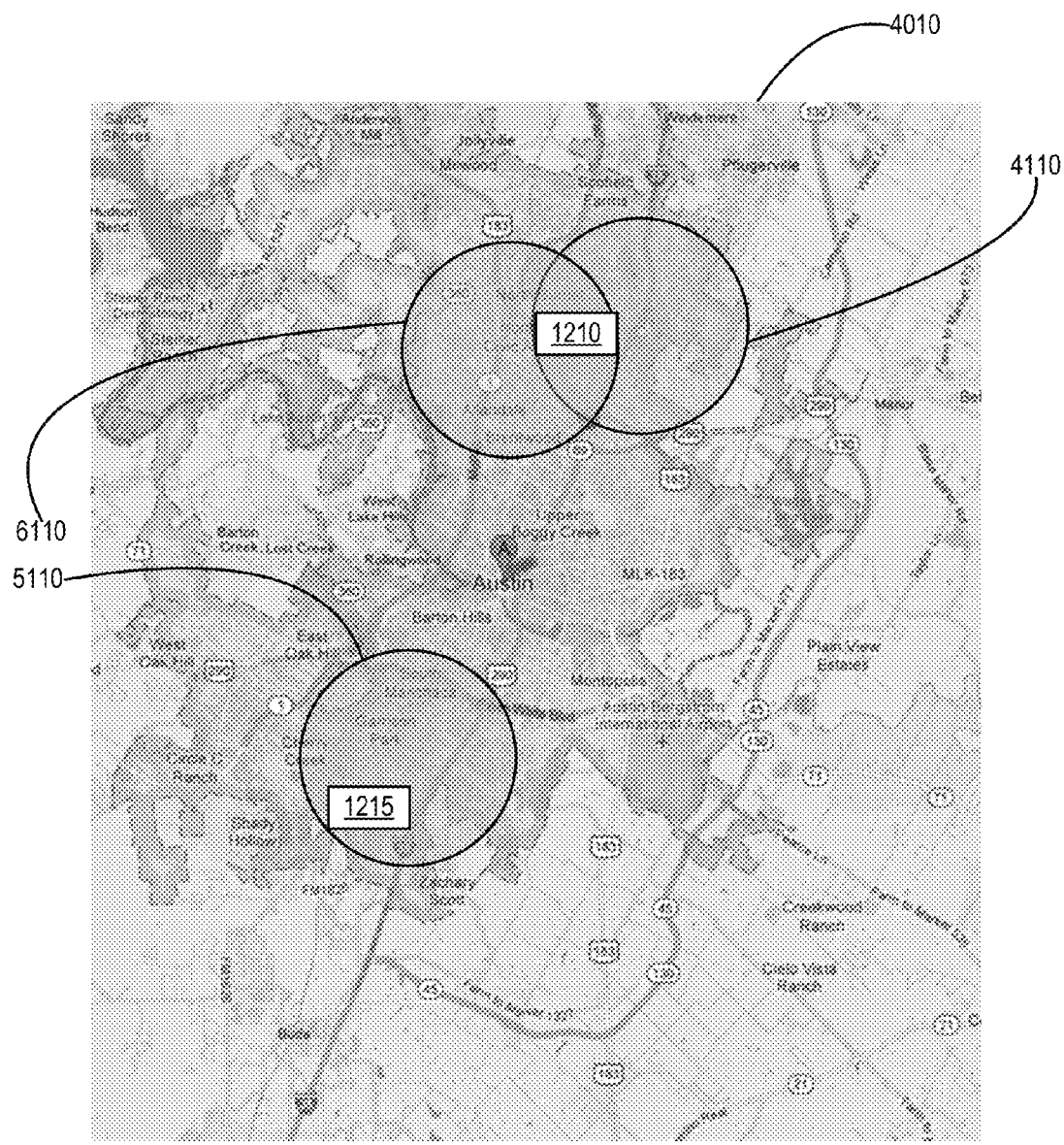

In one example, another search region can be selected. For instance, a search region 5110, as shown in FIG. 5, can be selected in addition to search region 4110, and input indicating search region 5110 can be received from the client via network 1010. As illustrated, search region 5110 can include location 1215. In a second example, another search region can be selected. For instance, a search region 6110, as shown in FIG. 6, can be selected in addition to search region 4110, and input indicating search region 6110 can be received from the client via network 1010. As illustrated in FIG. 6, one search region can overlap with another search region. In another example, multiple search regions can be selected. For instance, search regions 4110, 5110, and 6110 can be selected as shown in FIG. 7, and input indicating search regions 4110, 5110, and 6110 can be received from the client via network 1010.

In one or more embodiments, a search region can include one or more shapes and/or boundaries. For example, a search region can include a polygon. In one instance, a search region can include a triangular search region, such as a search region 8110 of FIG. 8. As illustrated search region 8110 can include location 1250. In a second instance, a search region can include a rectangular search region, such as a search region 8120 of FIG. 8. In a third instance, a search region can include a square search region, such as a search region 8130 of FIG. 8. In a fourth instance, a search region can include custom search region (e.g., a n-sided polygon), such as a search region 8140 of FIG. 8. As illustrated, search region 8140 can include locations 1225, 1230, and 1240.

Figure 8:
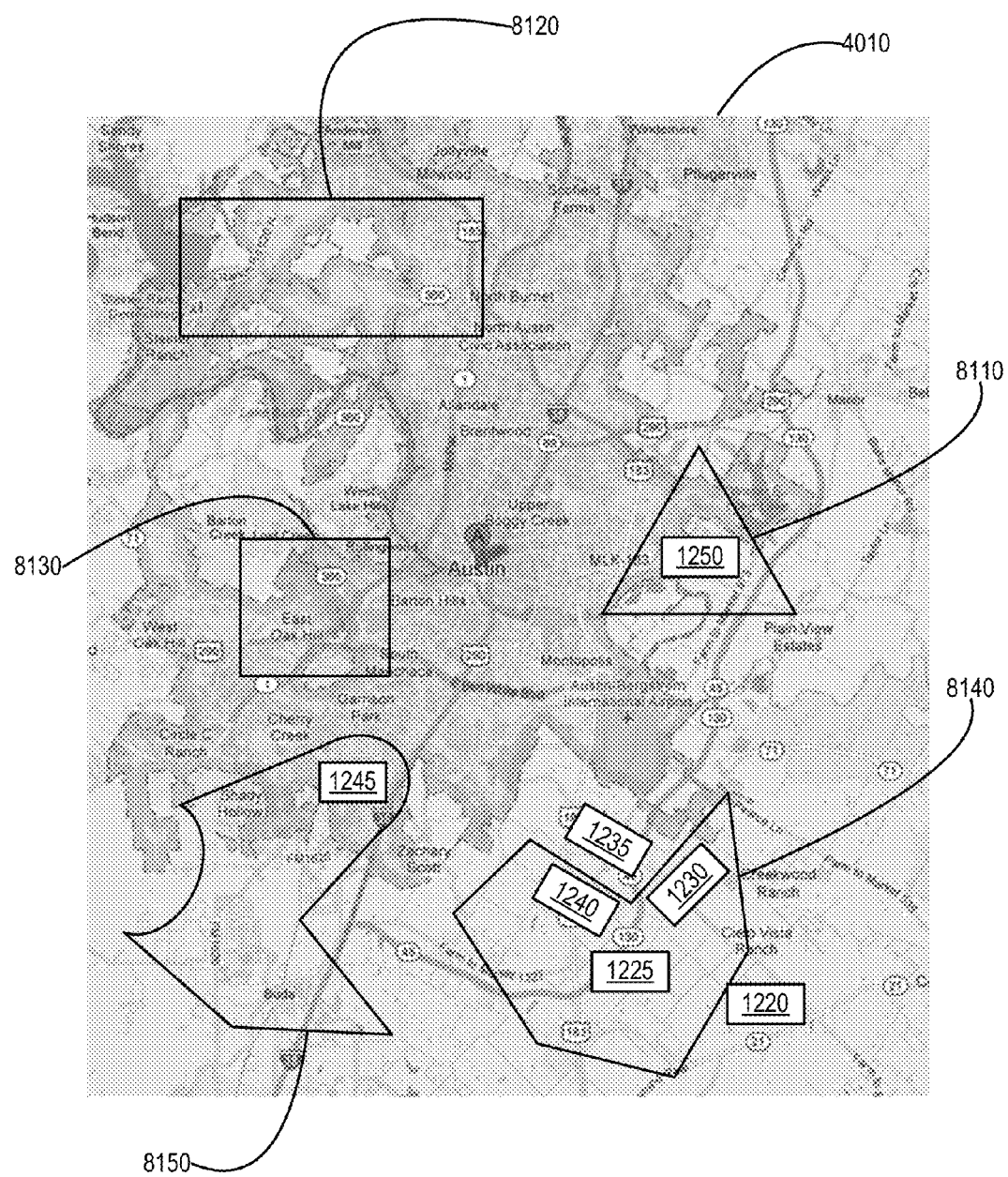

In another instance, a search region can include a custom search region (e.g., one or more straight edges with one or more arcs, elliptical arcs, parabolic arcs, splines, etc.), such as a search region 8150 of FIG. 8. As illustrated search region 8150 can include location 1245. In one or more embodiments, a custom search region can be utilized in implementing a search region of one or more of a voting district, a congressional district, a school district, a school, a campus, a dormitory, a police precinct, a piece of real estate, a neighborhood, a borrow, a city, a town, a commercial office building, a factory, a refinery, a storage facility, a power station, a power substation, and a military installation, among others.

In one or more embodiments, a custom search region can be described, transmitted, and/or stored via a markup language and/or a data description language. In one example, a custom search region can be described, transmitted, and/or stored via an extensible markup language (XML). In a second example, a custom search region can be described, transmitted, and/or stored via a keyhole markup language (KML). In another example, a custom search region can be described, transmitted, and/or stored via a language that can represent data structures (e.g., objects, arrays, associative arrays, etc.). For instance, the language that can represent data structures can be or include JSON (JavaScript Object Notation). In one or more embodiments, JSON can be utilized by any language that can support and/or utilize a JSON lexer and/or parser.

If there is not another search region, the method can proceed to 3050, as shown in FIG. 3, where input indicating a data search can be received. For example, the input indicating a data search can include one or more of a word, words, a phrase, a user profile, a portion of a user profile, a regular expression, a natural language filter, a grammar, a social group, an organization, and a user identification, among others. For instance, the input indicating a data search can be received from the client via network 1010. In one or more embodiments, the input indicating a data search can be or include search data. For example, the search data can include one or more of a word, words, a phrase, a user profile, a portion of a user profile, a regular expression, a natural language filter, a grammar, a social group, an organization, and a user identification, among others.

At 3055, it can be determined if there is additional search data. If there is additional search data, the method can proceed to 3050. If there is not additional search data, the method can proceed to 3060, where one or more queries can be generated. In one example, generating the one or more queries can include multiple supported geographical search region shapes. For instance, a search region can include one or more shapes that are not supported by one or more social media data sources, and the multiple supported geographical search region shapes can include the one or more shapes that are not supported by one or more social network media data sources. In a second example, the one or more queries can be based on one or more of the search region, the user input indicating a data search (e.g., search data), and one or more social network media data sources that store user-provided data (e.g., user input, user-provided content, social network user-provided data, social network user-provided content) from multiple users provided via multiple user computing devices at multiple locations (e.g., two or more of CDs 1110-1126 at respective locations 1210-1250), among others.

In another example, generating the one or more queries can include configuring and/or implementing the one or more queries with one or more a word, multiple words, a phrase, a user profile, a portion of a user profile, a regular expression, a natural language filter, a grammar, a social group, an organization, and a user identification, among others. In one instance, the one or more of the word, the multiple words, the phrase, the user profile, the portion of the user profile, the regular expression, the natural language filter, the grammar, the social group, the organization, and the user identification, among others, can match at least a portion of the user-provided data (e.g., user input, user-provided content, social network user-provided data, social network user-provided content) from multiple users provided via multiple user computing devices at multiple locations and/or can produce one or more search results. In another instance, one or more search results can be produced, generated, and/or precipitated via a satisfaction and/or a statistical satisfaction of one or more criteria that can include and/or can be based on the one or more of the word, the multiple words, the phrase, the user profile, the portion of the user profile, the regular expression, the natural language filter, the grammar, the social group, the organization, and the user identification, among others.

At 3070, the one or more queries can be provided to one or more social media data sources. In one example, one or more of API servers 2020-2024 can provide the one or more queries to one or more social media data sources, via network 1010. For instance, one or more of API servers 2020-2024 can query one or more social media data sources 1610-1640 based on the search data and the one or more search regions. In another example, one or more of application servers 2040-2050 can provide the one or more queries to one or more social media data sources, via network 1010. For instance, one or more of application servers 2040-2050 can query one or more social media data sources 1610-1640 based on the search data and the one or more search regions.

At 3080, one or more results of the query of the one or more social media data sources can be received. In one example, one or more of API servers 2020-2024 can receive one or more results of the query of one or more social media data sources 1610-1640 via network 1010. In another example, one or more of application servers 2040-2050 can receive one or more results of the query of one or more social media data sources 1610-1640 via network 1010. At 3090, the one or more results of the query of the one or more social media data sources can be stored. For example, a database can store the results of the query of the social media data sources. For instance, one or more of databases 2030-2034 can store the results of the query of social media data sources 1610-1640.

At 3100, the one or more results of the query of the one or more social media data sources can be provided to the client. In one example, one or more of API servers 2020-2024 can provide the results of the query of social media data sources 1610-1640 to the client via network 1010. In another example, one or more of application servers 2040-050 can provide the results of the query of social media data sources 1610-1640 to the client via network 1010.

In one or more embodiments, one or more locations (e.g., one or more locations where user data was provided by one or more users via one or more of their computing devices) can correspond to the one or more results of the one or more queries. In one example, location 1210 (as shown in FIG. 4), e.g., a location where user data was provided by one or more users via one or more of their computing devices, can correspond to the one or more results of the one or more queries, and the client can display location 1210 to a user, via a display device and/or a GUI. In a second example, locations 1210 and 1215 (as shown in FIG. 5), e.g., one or more locations where user data was provided by one or more users via one or more of their computing devices, can correspond to the one or more results of the one or more queries, and the client can display locations 1210 and 1215 to a user, via a display device and/or a GUI.

In a third example, location 1210 (as shown in FIG. 6) e.g., a location where user data was provided by one or more users via one or more of their computing devices, can correspond to the one or more results of the one or more queries, and the client can display location 1210 to a user, via a display device and/or a GUI. For instance, the one or more queries can include multiple search regions 4110 and 6110. In a fourth example, one or more of locations 1210 and 1215 (as shown in FIG. 7), e.g., one or more locations where user data was provided by one or more users via one or more of their computing devices, can correspond to the one or more results of the one or more queries, and the client can display to a user, via a display device and/or a GUI. For instance, the one or more queries can include one or more of search regions 4110, 5110, and 6110.

In a fifth example, one or more of locations 1225, 1230, 1240, 1245, and 1250 (as shown in FIG. 8), e.g., one or more locations where user data was provided by one or more users via one or more of their computing devices, can correspond to the one or more results of the one or more queries, and the client can display to a user, via a display device and/or a GUI. For instance, the one or more queries can include one or more of search regions 8110, 8120, 8130, and 8140. In another example, one or more of locations 22210-22232 (as shown in FIG. 22), e.g., one or more locations where user data was provided by one or more users via one or more of their computing devices, can correspond to the one or more results of the one or more queries. For instance, the client can display to a user, via a display device and/or a GUI, one or more locations 22210-22232 via a search region 22110 and/or via a map 22010.

In one or more embodiments, the one or more results of the query of the one or more social media data sources can be analyzed by the one or more of API servers 2020-2024 and/or one or more of application servers 2040-050 to provide analysis and/or conclusions about the results of the query of social media data sources 1610-1640. For example, the one or more results of the query of the one or more social media data sources can be filtered by one or more of API servers 2020-2024 and/or one or more of application servers 2040-050 to provide filtered results and/or analysis of the one or more queries of social media data sources 1610-1640 that include one or more of an identified word, phrase, user profile, portion of a user profile, regular expression, grammar, social group, organization, user identification, and a location, among others.

In one or more embodiments, a search region can include a shape that is not supported by one or more social media data sources. For example, one or more social media data sources may support one or more shapes for defining a search region but not other shapes. For instance, one or more social media data sources may support a circular search region (e.g., a location and a radius from the location). In this instance, search regions 4110-6110 can be supported by one or more social media data sources, while search regions 8110-8150 may not be supported. In one or more embodiments, a query of one or more social network media data sources for a search region that is not supported by one or more social media data sources can be performed. For example, one or more queries can be generated utilizing multiple of the one or more shapes defining search regions that can be supported by the one or more social media data sources in order to generate the one or more queries of a search region including a shape that is not supported by one or more social media data sources. For instance, multiple shapes of search regions that can be supported by the one or more social media data sources can be utilized to implement and/or support a search region shape that is not supported by the one or more social media data sources.

Figure 9:
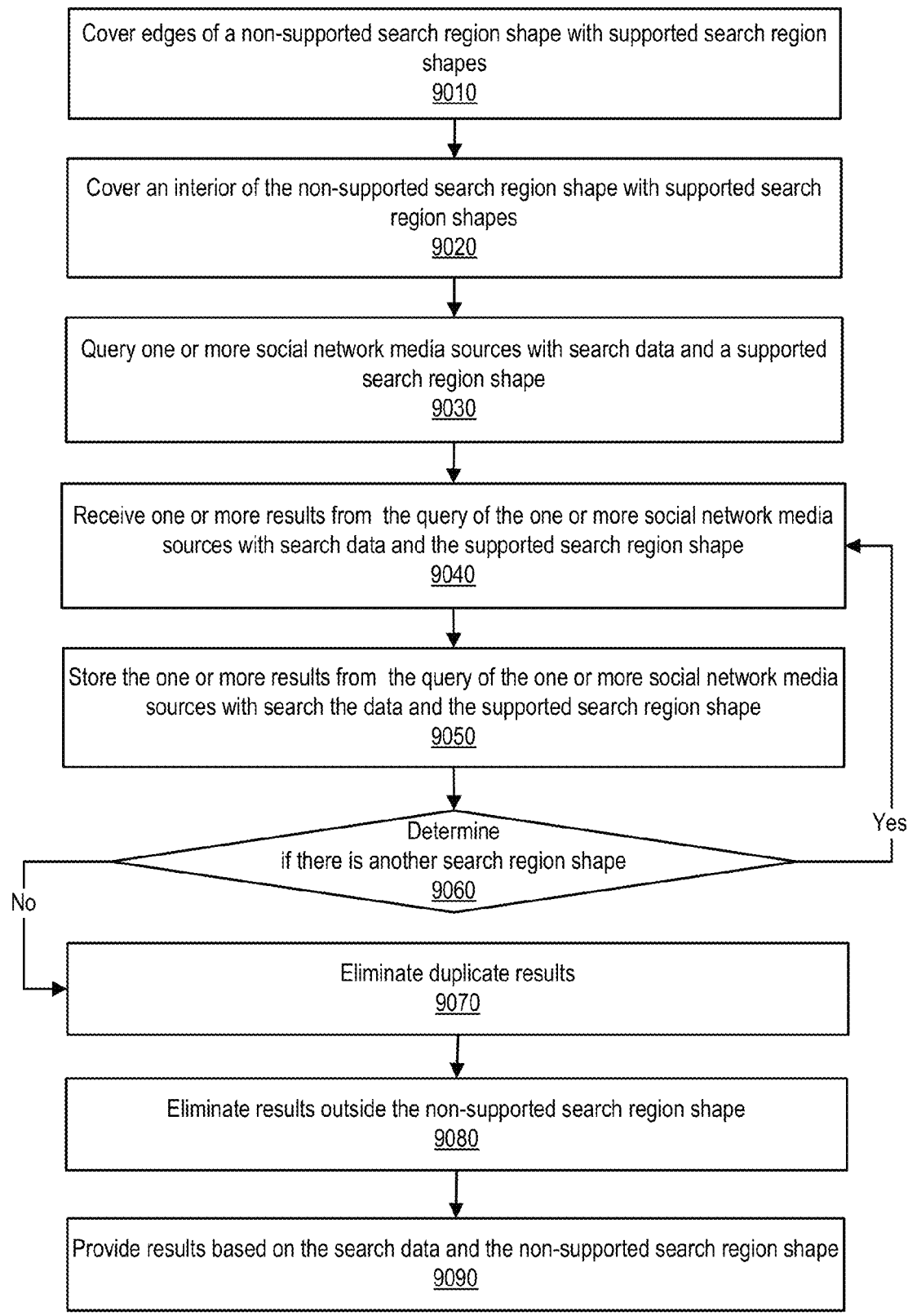
FIG. 9 provides an exemplary method of supporting a custom search region shape, according to one or more embodiments.
Figure 10:
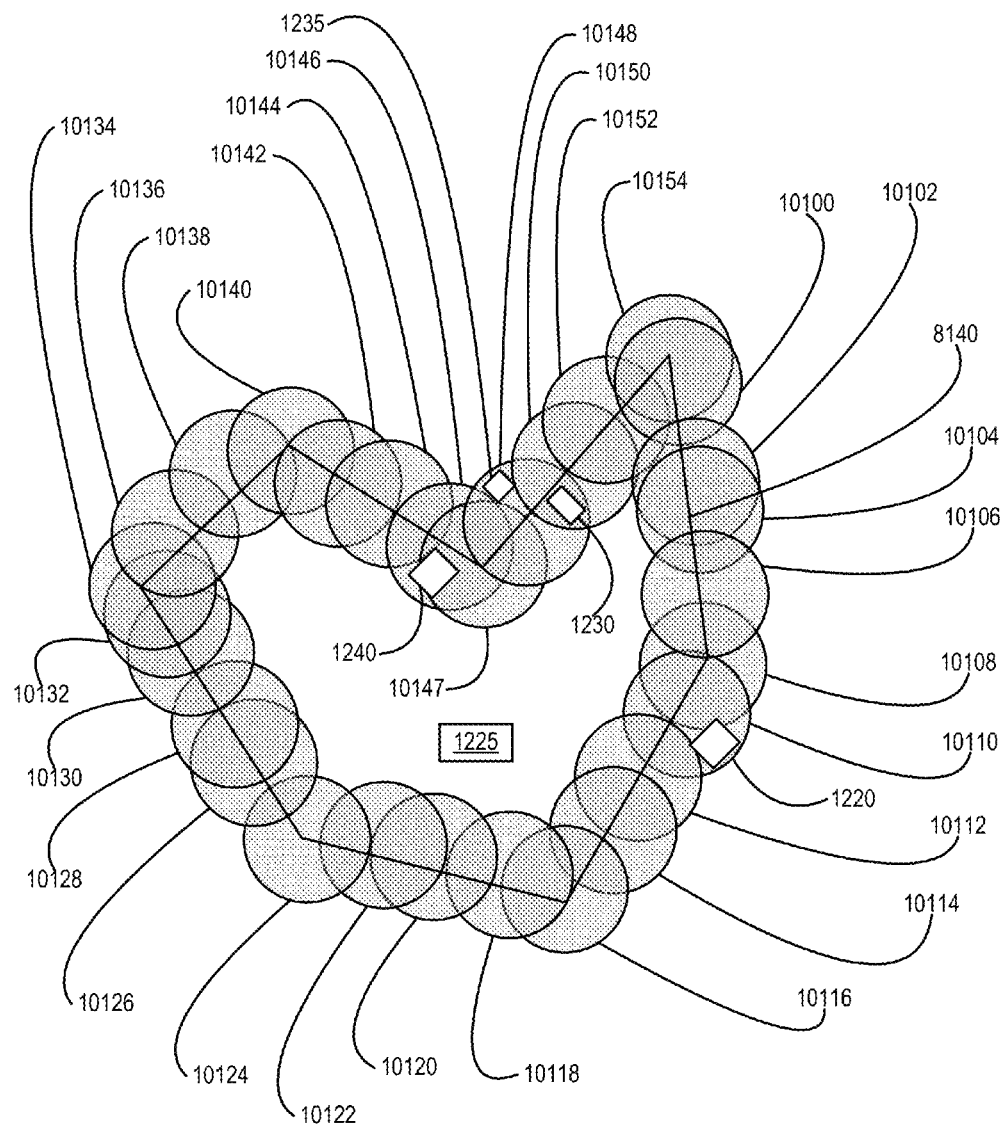
FIG. 10 illustrates edges of a custom search region shape covered by shapes of search regions supported by a social media data source, according to one or more embodiments.

Turning now to FIG. 9, an exemplary method of supporting a search region shape that is not supported by one or more social media data sources is illustrated, according to one or more embodiments. At 9010, edges of a custom search region shape can be covered by shapes of search regions that are supported by a social media data source. For example, as illustrated in FIG. 10, search region 8140 is a custom search region shape, and edges of search region 8140 can be covered by circular search regions 10100-10154, which are supported search region shapes, in some examples.

Figure 11:
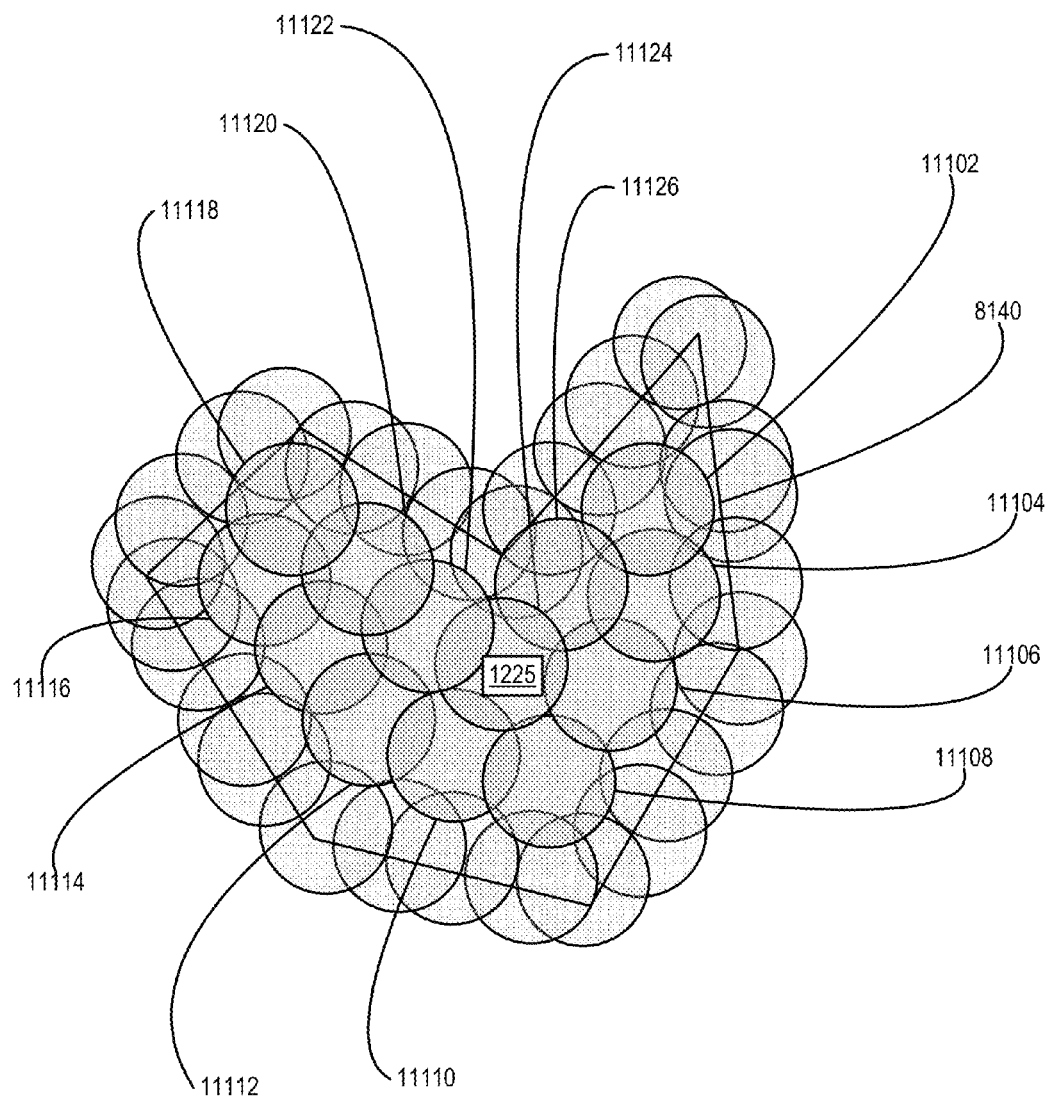
FIG. 11 illustrates an interior of the custom search region shape covered by shapes of search regions supported by a social media data source.

At 9020, an interior of the custom search region shape can be covered by shapes of search regions that are supported by a social media data source. For example, search region 8140 is a custom search region shape, and an interior of search region 8140 can be covered by circular search regions 11102-11126 that are supported search region shapes, as illustrated in FIG. 11. For instance, search region 11124 includes location 1225.

At 9030, one or more social network media data sources can be queried. For example, the query can include search data and a supported search region. For instance, the search data can include one or more of a word, a phrase, a user profile, a portion of a user profile, a social group, an organization, a user identification, a regular expression, and a grammar, among others, and the supported search region can include a search region of search regions 10100-11126. At 9040, one or more results of the query, associated with and/or corresponding to the supported search region, can be received. At 9050, the one or more results of the query can be stored.

At 9050, it can be determined if there is another search region shape. If there is another search region shape, the method can proceed to 9040. If there is not another search region shape, the method can proceed to 9070, where one or more duplicates of the search results can be eliminated.

In one or more embodiments, two or more of the supported search region shapes can intersect, and those intersections can yield duplicates in results of the queries based on respective search region shapes. For example, search regions 10148 and 10150 intersect and can produce one or more duplicates in search data results, since an area of an intersection of search regions 10148 and 10150 can be searched multiple times. For instance, search regions 10148 and 10150 intersect and include location 1230, as illustrated in FIG. 10, and one or more duplicates of the search data results of an intersection of search regions 10148 and 10150 can be eliminated.

At 9080, one or more results that correspond to one or more locations outside the custom search region shape can be eliminated. For example, one or more locations that are outside one or more edges of search region 8140 can be eliminated. For instance, search region 10110 can include one or more locations outside one or more edges of search region 8140, and results associated with and/or corresponding to the one or more locations outside one or more edges of search region 8140 can be eliminated. As illustrated in FIG. 10, search region 10110 can include location 1220, and location 1220 is outside one or more edges of search region 8140. As such, one or more results associated with and/or corresponding to location 1220 can be eliminated as falling outside the boundary of the custom search region shape. At 9090, one or more results based on the search data and the custom search region shape can be provided to the client.

Figure 12:
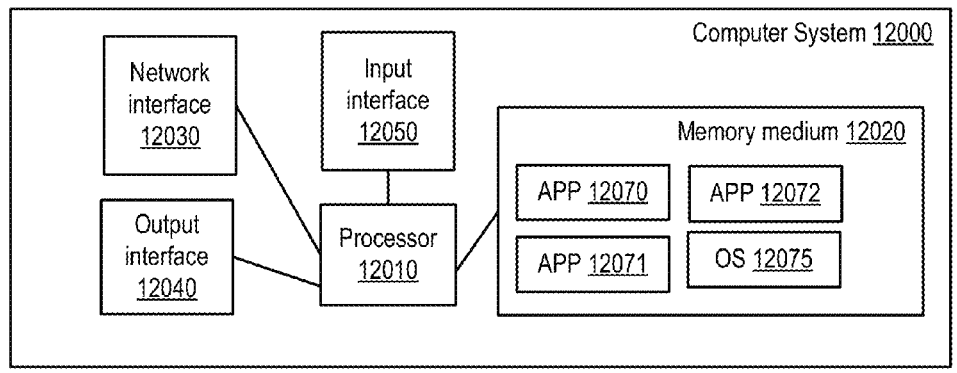
FIG. 12 provides an exemplary block diagram of a computer system, according to one or more embodiments.

Turning now to FIG. 12, a computer system is illustrated, according to one or more embodiments. As shown, a computer system 12000 can include a processor 12010 coupled to a memory medium 12020. In one or more embodiments, processor 12010 can include and/or implement an instruction set architecture (ISA) that can include instructions that can be stored via memory medium 12020 and/or can be executable by processor 12010

As illustrated, memory medium can include one or more applications (APPs) 12070-12072 and an operating system (OS) 12075. In one or more embodiments, one or more of APPs 12070-12072 and OS 12075 can store instructions, executable by processor 12010, that can include one or more software programs in accordance with one or more of methods, processes and/or flowcharts described herein.

As illustrated, computer system 12000 can include a network interface 12030 coupled to processor 12010. In one example, network interface 12030 can be configured to couple computer system 12000 to network 1010. In a second example, network interface 12030 can be configured to couple computer system 12000 to a wireless AP. In a third example, network interface 12030 can be configured to couple computer system 12000 to a wired AP or gateway (e.g., a cable modem, a DSL modem, a router, a switch, etc.). In another example, network interface 12030 can be configured to couple computer system 12000 to a wireless telephone network (e.g., a cellular telephone network, a satellite telephone network, etc.).

As shown, computer system 12000 can include an output interface 12040 coupled to processor 12010. In one example, output interface 12040 can include a display that can convey graphical information to a user. In another example, output interface 12040 can be configured to be coupled to a display that can convey graphical information to a user. In another example, output interface 12040 can include or can be configured to be coupled to an audio output device (e.g., a speaker).

As illustrated, computer system 12000 can include an input interface 12050. In one example, input interface 12050 can include one or more of a keyboard and a mouse, among others. In a second example, input interface 12050 can be configured to be coupled to one or more of a keyboard and a mouse, among others. In a third example, input interface 12050 can include an input of a touch screen. In a fourth example, input interface 12050 can include or can be configured to be coupled to an audio input device (e.g., a microphone). In another example, input interface 12050 can be configured to be coupled to an input of a touch screen. In one or more embodiments, one or more of CDs 1110-1132, API servers 2020-2024, databases 2030-2034, and application servers 2040-2050 can include one or more structures and/or functionalities described with reference to computer system 12000.

In one or more embodiments, a computer system can include a field programmable gate array (FPGA) coupled to a memory medium, and the memory medium can store data and/or configuration information that can be utilized by the FPGA in implementing one or more systems, methods, and/or processes described herein. For example, the configuration information and/or the one or more instructions can include a hardware description language and/or a schematic design that can be utilized by the FPGA to implement one or more systems, methods, and/or processes described herein. In one or more embodiments, the FPGA can include multiple programmable logic components that can be configured and coupled to one another in implementing one or more systems, methods, and/or processes described herein.

In one or more embodiments, the FPGA can be coupled to one or more of a network interface, an output interface, and an input interface. In one or more embodiments, one or more of the network interface, the output interface, and the input interface can provide and/or implement one or more structures and/or functionalities as described above.

In one or more embodiments, a computer system can include an application specific processor (ASIC) coupled to a memory medium. In one or more embodiments, the memory medium can store data and/or configuration information that can be utilized by the ASIC in implementing one or more systems, methods, and/or processes described herein. For example, the memory medium can store a configuration, and the configuration can include configuration information and/or one or more instructions that can be utilized by the ASIC to implement one or more systems, methods, and/or processes described herein. In one or more embodiments, the memory medium can store data and/or instructions that can be executed by the ASIC. For instance, one or more APPs and/or an OS can include instructions of an ISA associated with the ASIC.

In one or more embodiments, the ASIC can be coupled to one or more of a network interface, an output interface, and an input interface. In one or more embodiments, one or more of the network interface, the output interface, and the input interface can provide and/or implement one or more structures and/or functionalities as described above.

In one or more embodiments, a computer system can include graphics processing unit (GPU) coupled to a memory medium. For example, the GPU can be or include a general purpose graphics processing unit (GPGPU). In one or more embodiments, the memory medium can store data and/or configuration information that can be utilized by the GPU in implementing one or more systems, methods, and/or processes described herein. For example, the memory medium can store a configuration, and the configuration can include configuration information and/or one or more instructions that can be utilized by the GPU to implement one or more systems, methods, and/or processes described herein.

In one or more embodiments, the GPU can be coupled to one or more of a network interface, an output interface, and an input interface. In one or more embodiments, one or more of the network interface, the output interface, and the input interface can provide and/or implement one or more structures and/or functionalities as described above.

Figure 13:
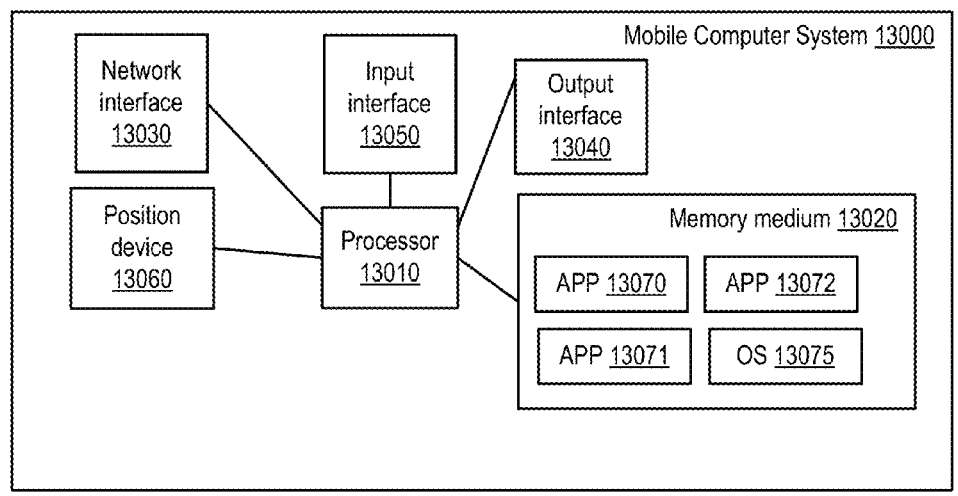
FIG. 13 illustrates a mobile computer system, according to one or more embodiments.

Turning now to FIG. 13, a mobile computer system is illustrated, according to one or more embodiments. As shown, a mobile computer system 13000 can include a processor 13010 coupled to a memory medium 13020. As illustrated, memory medium can include one or more APPs 13070-13072 and an OS 13075. In one or more embodiments, one or more of APPs 13070-13072 and OS 13075 can store instructions, executable by processor 13010, that can include one or more software programs in accordance with one or more of methods, processes and/or flowcharts described herein.

As illustrated, mobile computer system 13000 can include a network interface 13030 coupled to processor 12010. In one example, network interface 13030 can be configured to couple mobile computer system 13000 to network 1010. In a second example, network interface 13030 can be configured to couple mobile computer system 13000 to a wireless AP. In a third example, network interface 13030 can be configured to couple mobile computer system 13000 to a wired AP or gateway (e.g., a cable modem, a DSL modem, a router, a switch, etc.). In another example, network interface 13030 can be configured to couple computer system 13000 to a wireless telephone network (e.g., a cellular telephone network, a satellite telephone network, etc.).

As shown, mobile computer system 13000 can include an output interface 13040 coupled to processor 13010. In one example, output interface 12040 can include a display that can convey graphical information to a user. In another example, output interface 13040 can be configured to be coupled to a display that can convey graphical information to a user. In another example, output interface 13040 can include or can be configured to be coupled to an audio output device (e.g., a speaker).

As illustrated, mobile computer system 13000 can include an input interface 13050. In one example, input interface 13050 can include one or more of a keyboard and a mouse, among others. In a second example, input interface 13050 can be configured to be coupled to one or more of a keyboard and a mouse, among others. In a third example, input interface 13050 can include an input of a touch screen. In a fourth example, input interface 13050 can include or can be configured to be coupled to an audio input device (e.g., a microphone). In another example, input interface 13050 can be configured to be coupled to an input of a touch screen.

As shown, mobile computer system 13000 can include a position device 13060 coupled to processor 13010. For example, position device 13060 can determine location information and/or provide the location information to processor 13010. For instance, position device 13060 can determine location information based on one or more of multilateration, trilateration, triangulation, and multiangulation, among others. In one or more embodiments, position device 13060 can include a GPS device and/or mechanism. For example, a GPS device and/or mechanism can determine location information and provide the determined location information to processor 13010. In one or more embodiments, one or more of CDs 1110-1132 can include one or more structures and/or functionalities described with reference to mobile computer system 13000.

In one or more embodiments, mobile computer system 13000 may not include position device 13060. For example, position device 13060 can be eliminated from a design and/or implementation of mobile computer system 13000 to conserve utilization of a power source of mobile computer system 13000.

Figure 14:
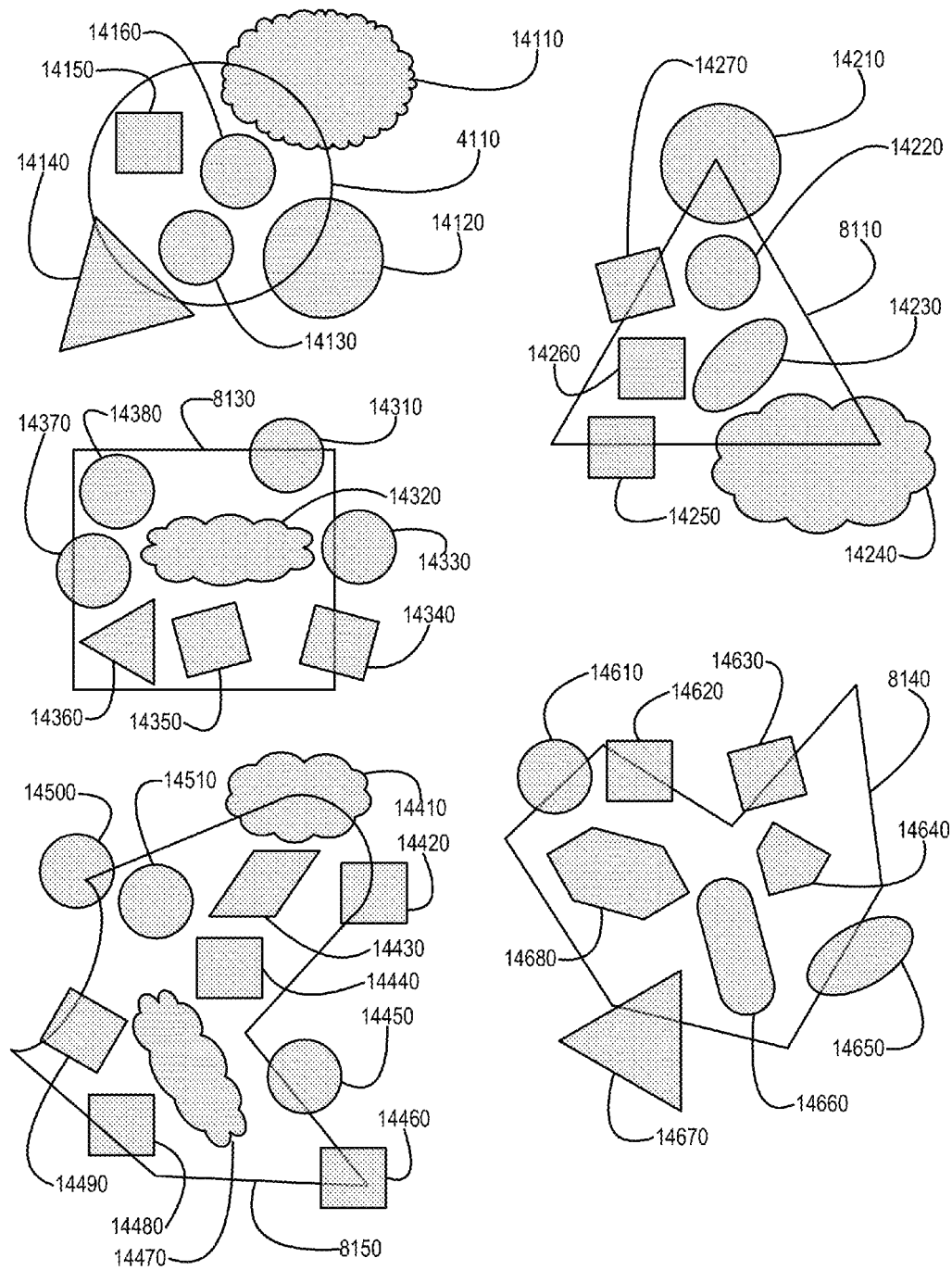
FIG. 14 provides an exemplary diagram of search regions and geographic context regions, according to one or more embodiments.

Turning now to FIG. 14, an exemplary diagram of search regions and geographic context regions is illustrated, according to one or more embodiments. In one or more embodiments, a geographic context region can include one or more locations. For instance, a geographic context region (e.g., a geographic context region of geographic context regions 14110-14680) can include one or more of a street number, a street, a zip code, a city, a state, a country, a unit identifier (e.g., a suite identifier, a condominium identifier, a hospital room identifier, an apartment identifier, a gate identifier of an airport, an airport identifier, etc.), a cell identification (cell ID or CID associated with a cellular telephone network), latitude information, longitude information, and altitude information, among others.

In one or more embodiments, a geographic context region can be, include, and/or be associated with one or more of a voting district, a congressional district, a school district, a school, a campus, a dormitory, an oil pipeline, a sports complex, a police precinct, a piece of real estate, a neighborhood, a borrow, a city, a town, a commercial office building, a floor of a building, a factory, a refinery, a storage facility, a power station, a power substation, a military installation, and a census designated place (CDP), among others. In one or more embodiments, an account of a user and/or a device of the user can be associated with a geographic context region. For example, the account of the user and/or the device of the user can be associated with a geographic context region of geographic context regions 14110-14680.

In one or more embodiments, an account of a user and/or a device of a user can be associated with a geographic context region, and the geographic context region can be utilized in determining a geographic location of the user and/or of the device of the user if location-based service are not provided and/or available when the user communicates utilizing one or more of the account of the user and the device of the user. In one example, the device of the user may not provide a geographic location of the user. In one instance, the device of the user may not include a GPS device. In another instance, a GPS device of the device of the user may not be utilized when the user of the device utilized the device for communication. In a second example, a geographic location of an access point, utilized by the device of the user, may not be available.

In another example, a social media data source may not provide user communications for one or more geographic context regions, unless the social media data source is queried for the user communications for the one or more geographic context regions.

As illustrated, search region 4110 can intersect, in whole or in part, one or more of geographic context regions 14110-14160. As shown, search region 4110 can include one or more of geographic context regions 14130, 14150, and 14160. As illustrated, search region 8110 can intersect one or more of geographic context regions 14210-14270. As shown, search region 8110 can include one or more of geographic context regions 14220, 14230, and 14260. As illustrated, search region 8310 can intersect one or more of geographic context regions 14310-14380. As shown, search region 8310 can include one or more of geographic context regions 14320, 14350, and 14360.

As illustrated, search region 8150 can intersect one or more of geographic context regions 14410-14510. As shown, search region 8150 can include one or more of geographic context regions 14430, 14440, 14470, and 14510. As illustrated, search region 8140 can intersect one or more of geographic context regions 14610-14680. As shown, search region 8140 can include one or more of geographic context regions 14640, 14660, and 14680.

In one or more embodiments, a geographic context region can be associated with and/or include one or more shapes. For example, a geographic context region can be associated with and/or include one or more shapes, polygons, circles, ellipses, straight edges, arcs, elliptical arcs, parabolic arcs, and splines, among others.

Figure 15:
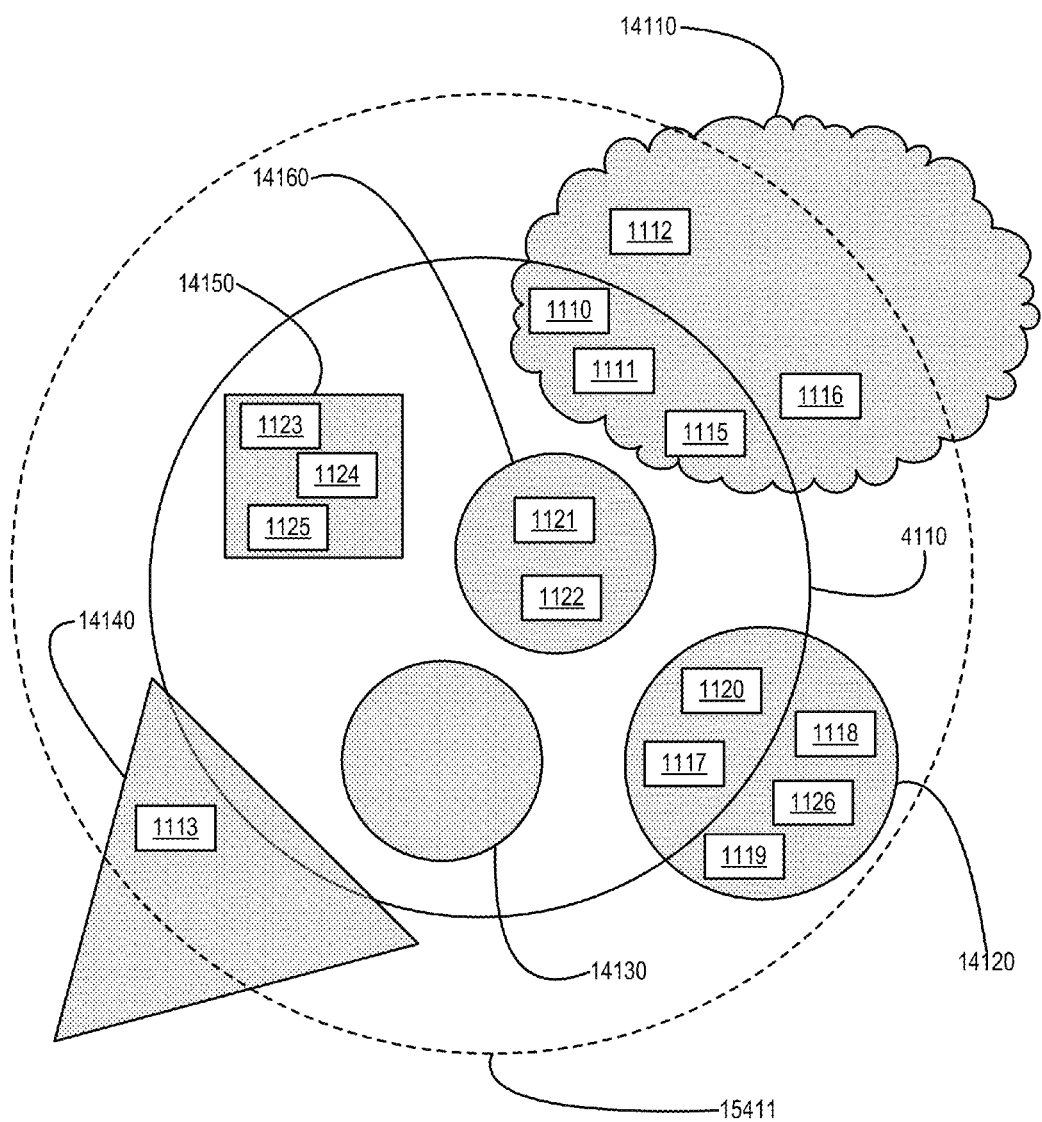
FIG. 15 provides a first exemplary diagram of a search region, an expanded search region, and geographic context regions that can include respective zero or more computing devices, according to one or more embodiments.

Turning now to FIG. 15, an exemplary diagram of a search region, an expanded search region, and geographic context regions that can include respective zero or more computing devices is illustrated, according to one or more embodiments. As shown, geographic context region 14110 can include computing devices 1110-1112, 1115, and 1116. As illustrated, geographic context region 14120 can include computing devices 1117-1120 and 1126. As shown, geographic context region 14120 can include no computing device. As illustrated, geographic context region 14140 can include computing device 1113. As shown, geographic context region 14150 can include computing devices 1123-1125. As illustrated, geographic context region 14160 can include computing devices 1121 and 1122.

In one or more embodiments, a search region can be expanded to determine if one or more geographic context regions intersect the search region. For example, search region 4110 can be expanded to determine if one or more geographic context regions are included in an expanded search region 15411, as illustrated. For instance, a diameter (or radius) of search region 4110 can be expanded by a factor greater than one (e.g., 1.061, 1.314159, 1.5, 2, 2.71828, etc.). In one or more embodiments, a geographic context region can be associated with a location, and determining if the geographic context region is included in an expanded search region can include determining if the expanded search region includes the location associated with the geographic context region. For example, if the geographic context region is included in the expanded search region, then the geographic context region intersects the search region.

In one or more embodiments, determining if a geographic context region is included in an expanded search region can include determining if the expanded search region includes the geographic context region. For example, determining if the expanded search region includes the geographic context region can include determining if the expanded search region includes all points and/or positions of the geographic context region.

In one or more embodiments, determining if a geographic context region is included in an expanded search region can include determining if the expanded search region includes a geometric center (e.g., a centroid) of the geographic context region. In one or more embodiments, a geographic context region can be, can include, and/or can be approximated via a shape in a plane. For example, a geometric center of a geographic context region can be or include an arithmetic mean (e.g., an average) position of points of the geographic context region. For instance, if the geometric center of a geographic context region is included in the expanded search region, then the geographic context region intersects the search region.

In one or more embodiments, geographic context regions 14120, 14130, 14250, and 14160 can be included in search region 15411. In one example, search region 15411 includes all points and/or positions of geographic context regions 14120, 14130, 14250, and 14160. In another example, expanded search region 15411 may not include all points and/or positions of geographic context regions 14110 and 14140.

In one or more embodiments, if all points and/or positions of a geographic context region are not included within an expanded search region, then an identification the geographic context region may be included in one or more results of one or more queries, based on the expanded search region, of one or more social media data sources. In one example, all points and/or positions of geographic context region 14110 are not included within expanded search region 15411, and an identification of geographic context region 14110 may not be included in one or more results of one or more queries, based on expanded search region 15411, of one or more social media data sources. For instance, one or more queries of one or more social media data sources may not be based on one or more of CDs 1110-1112, 1115, and 1116, since an identification geographic context region 14110 may not be included in one or more results of one or more queries of one or more social media data sources.

In another example, all points and/or positions of geographic context region 14140 are not included within an expanded search region, and an identification geographic context region 14140 may not be included in one or more results of one or more queries, based on expanded search region 15411, of one or more social media data sources. For instance, one or more queries of one or more social media data sources may not be based on CD 1113, since an identification geographic context region 14140 may not be included in one or more results of one or more queries of one or more social media data sources.

In one or more embodiments, geographic context regions 14110-14160 can be included in search region 15411. In one example, geographic context regions 14110-14160 can be associated with respective locations, and the respective locations of geographic context regions 14110-14160 can be included in and/or lie within search region 15411. In another example, geographic context regions 14110-14160 can be associated with respective geometric centers, and the respective geometric centers of geographic context regions 14110-14160 can be included in and/or lie within search region 15411.

In one or more embodiments, one or more computing devices can be ignored and/or eliminated if the one or more computing devices are included in a geographic context region but are not included in a search region. For example, one or more of CDs 1118, 1119, and 1126 can be ignored and/or eliminated as one or more of CDs 1118, 1119, and 1126 are included in geographic context region 14120 but are not included in search region 4110. For instance, one or more queries can be generated, to be provided to one or more social media data sources, without one or more associations to one or more of CDs 1118, 1119, and 1126.

In one or more embodiments, one or more queries can be generated, can be based on one or more geographic context regions (e.g., one or more of geographic context regions 14110-14160), and can be provided to one or more social media data sources. In one example, one or more of API servers 2020-2024 can provide the one or more queries to one or more social media data sources, via network 1010. For instance, one or more of API servers 2020-2024 can query one or more social media data sources 1610-1640 based on search data (e.g., one or more of a word, words, a phrase, a user profile, a portion of a user profile, a regular expression, a natural language filter, a grammar, a social group, an organization, a user identification, etc.) and the one or more geographic context regions. In another example, one or more of application servers 2040-2050 can provide the one or more queries to one or more social media data sources, via network 1010. For instance, one or more of application servers 2040-2050 can query one or more social media data sources 1610-1640 based on the search data and the one or more geographic context regions.

Figure 16:
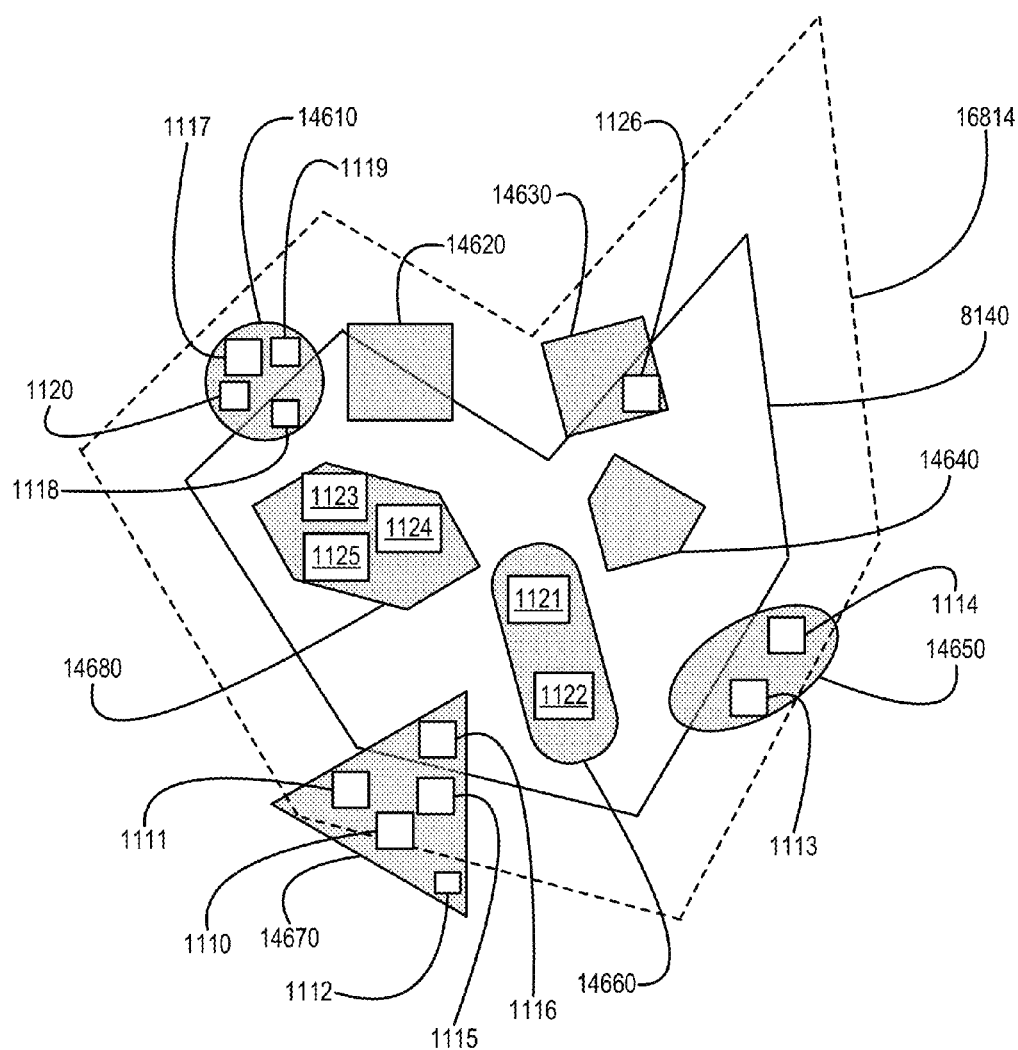
FIG. 16 provides a second exemplary diagram of a search region, an expanded search region, and geographic context regions that can include respective zero or more computing devices, according to one or more embodiments.

Turning now to FIG. 16, another exemplary diagram of a search region, an expanded search region, and geographic context regions that can include respective zero or more computing devices is illustrated, according to one or more embodiments. As shown, geographic context region 14610 can include computing devices 1117-1120. As illustrated, geographic context region 14620 can include no computing device. As shown, geographic context region 14630 can include computing device 1126. As illustrated, geographic context region 14640 can include no computing device. As shown, geographic context region 14650 can include computing devices 1113 and 1114. As illustrated, geographic context region 14660 can include computing devices 1121 and 1122. As shown, geographic context region 14670 can include computing devices 1110-1112, 1115, and 1116. As illustrated, geographic context region 14680 can include computing devices 1123-1125.

In one or more embodiments, one or more computing devices can be ignored and/or eliminated as the one or more computing devices can be included in a geographic context region but are not included in a search region. For example, one or more of CDs 1117, 1119, and 1120 can be ignored and/or eliminated as one or more of CDs 1117, 1119, and 1120 can be included in geographic context region 14610 but are not included in search region 8140. For instance, one or more queries can be generated, to be provided to one or more social media data sources, without one or more associations to one or more of CDs 1117, 1119, and 1120.

In one or more embodiments, if all points and/or positions of a geographic context region are not included within an expanded search region, then an identification the geographic context region may be included in one or more results of one or more queries, based on the expanded search region, of one or more social media data sources. For example, all points and/or positions of geographic context region 14670 are not included within expanded search region 16814, and an identification of geographic context region 14670 may not be included in one or more results of one or more queries, based on expanded search region 16814, of one or more social media data sources. For instance, one or more queries of one or more social media data sources may not be based on one or more of CDs 1110-1112, 1115, and 1116, since an identification geographic context region 14670 may not be included in one or more results of one or more queries of one or more social media data sources.

In one or more embodiments, a search region can be expanded to determine if one or more geographic context regions intersect the search region. For example, search region 8140 can be expanded to determine if one or more geographic context regions are included in an expanded search region 16814, as illustrated. For instance, a diameter (or radius) of search region 8140 can be expanded by a factor greater than one (e.g., 1.061, 1.314159, 1.5, 2, 2.71828, etc.). In one or more embodiments, a geographic context region can be associated with a location, and determining if the geographic context region is included in an expanded search region can include determining if the expanded search region includes the location associated with the geographic context region. For example, if the geographic context region is included in the expanded search region, then the geographic context region intersects the search region.

In one or more embodiments, geographic context regions 14610-14680 can be included in search region 16814. In one example, geographic context regions 14610-14680 can be associated with respective locations, and the respective locations of geographic context regions 14610-14680 can be included in and/or lie within search region 16814. In a second example, geographic context regions 14610-14680 can be associated with respective geometric centers, and the respective geometric centers of geographic context regions 14610-14680 can be included in and/or lie within search region 16814. In another example, all points and/or positions of geographic context regions 14610-14640, 14650, and 14680 can be included in and/or lie within search region 16814.

In one or more embodiments, one or more queries can be generated, can be based on one or more geographic context regions (e.g., one or more of geographic context regions 14610-14680), and can be provided to one or more social media data sources. In one example, one or more of API servers 2020-2024 can provide the one or more queries to one or more social media data sources, via network 1010. For instance, one or more of API servers 2020-2024 can query one or more social media data sources 1610-1640 based on search data (e.g., one or more of a word, words, a phrase, a user profile, a portion of a user profile, a regular expression, a natural language filter, a grammar, a social group, an organization, a user identification, etc.) and the one or more geographic context regions. In another example, one or more of application servers 2040-2050 can provide the one or more queries to one or more social media data sources, via network 1010. For instance, one or more of application servers 2040-2050 can query one or more social media data sources 1610-1640 based on the search data and the one or more geographic context regions.

Figure 17:
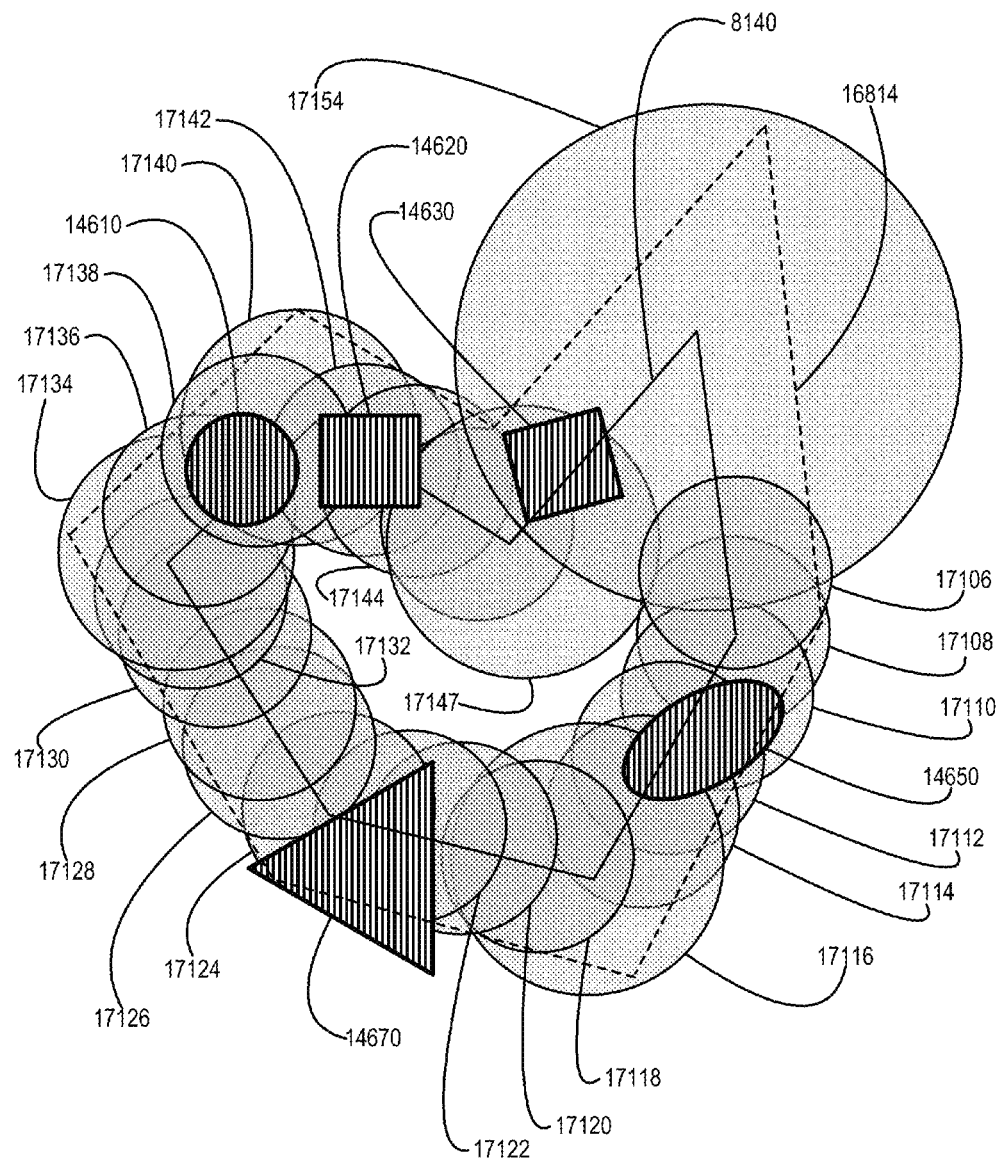
FIG. 17 provides an exemplary diagram of expanding a search region shape that is not supported by one or more social media data sources, according to one or more embodiments.

Turning now to FIG. 17, an exemplary diagram of expanding a search region shape that is not supported by one or more social media data sources is illustrated, according to one or more embodiments. In one or more embodiments, one or more supported search regions, associated with a search region shape that is not supported by one or more social media data sources, can be expanded. For example, one or more supported search regions 10100-10154 (illustrated in FIG. 10), associated with search region 8140, can be expanded. For instance, a diameter (or radius) of a supported search region (e.g., a supported search region of supported search regions 10100-10154) can be expanded by a factor greater than one (e.g., 1.061, 1.314159, 1.5, 2, 2.71828, etc.) and/or a function that can produce a factor. As illustrated, expanded supported search regions 17106-17154 can be utilized to expand a search region shape that is not supported by one or more social media data sources.

In one or more embodiments, a supported search region that lies on or proximate to an intersection of lines which precipitates an angle between the two lines can be expanded by a factor greater than one and/or a function that can produce a factor. In one example, a function such as $$\text{Diameter}_{NEW}(g, k) = \text{Diameter}_{OLD} \cdot g \cdot \left(\frac{17}{24}\right) \cdot \left(\frac{180}{k}\right),$$

where g can be or include a factor greater than one (e.g., 1.061, 1.314159, 1.5, 2, 2.71828, etc.) and k can be or include an angle of intersecting lines, can be utilized to produce a factor that can be utilized to expand a supported search region that lies on an intersection of lines. In another example, if $\text{Diameter}_{NEW}(g,k) < \text{Diameter}_{OLD} \cdot g$ (where g can be or include a factor greater than one (e.g., 1.061, 1.314159, 1.5, 2, 2.71828, etc.)), then g can be utilized as a factor that can be utilized to expand a supported search region that lies on an intersection of lines.

As illustrated, an expanded search region 17154 (e.g., an expanded supported search region), illustrated in FIG. 17, can be produced via expanding supported search region 10154, as illustrated in FIG. 10, utilizing $\text{Diameter}_{NEW}(g,k)$ as a diameter of expanded search region 17154, where $$\text{Diameter}_{NEW}(g, k) = \text{Diameter}_{OLD} \cdot g \cdot \left(\frac{17}{24}\right) \cdot \left(\frac{180}{k}\right),$$

g is 1.5, k is forty-nine (e.g., forty-nine degrees), and $\text{Diameter}_{OLD}$ is a diameter of supported search region 10154.

As shown, expanded search region 17124 (e.g., an expanded supported search region), illustrated in FIG. 17, can be produced via expanding supported search region 10124, as illustrated in FIG. 10, utilizing $\text{Diameter}_{NEW}(g) = \text{Diameter}_{OLD} \cdot g$, where g is 1.5, as a diameter of expanded search region 17124, since $\text{Diameter}_{NEW}(g,k) < \text{Diameter}_{OLD} \cdot g$, where $$\text{Diameter}_{NEW}(g, k) = \text{Diameter}_{OLD} \cdot g \cdot \left(\frac{17}{24}\right) \cdot \left(\frac{180}{k}\right),$$

where g is 1.5, k is one hundred and thirty-eight (e.g., one hundred and thirty-eight degrees), and $\text{Diameter}_{OLD}$ is a diameter of supported search region 10124.

In one or more embodiments, a supported search region that lies on a straight edge (e.g., a line), an arc, an elliptical arc, a parabolic arc, or a spline can be expanded by a factor greater than one (e.g., 1.061, 1.314159, 1.5, 2, 2.71828, etc.). For example, expanded search region 17106 (e.g., an expanded supported search region), illustrated in FIG. 17, can be produced via expanding supported search region 10106, as illustrated in FIG. 10, utilizing an expansion factor of 1.5. For instance, a diameter of supported search region 10106 can be expanded by 1.5 to produce a diameter for expanded search region 17106.

In one or more embodiments, one or more supported search regions that lie on respective one or more intersection of lines, which precipitate respective one or more angles, can be expanded before other one or more supported search regions that do not lie on respective one or more intersection of lines. For example, one or more of supported search regions 10108, 10116, 10124, 10134, 10140, 10147, and 10154 (as illustrated in FIG. 10) can be expanded into respective one or more supported search regions 17108, 17116, 17124, 17134, 17140, 17147, and 17154 (as illustrated in FIG. 17) before other one or more supported search regions that do not lay on respective one or more intersection of lines.

In one or more embodiments, one or more supported search regions can be expanded and not utilized to expand a search region shape that is not supported by one or more social media data sources. For example, one or more supported search regions can be expanded and can be included in or within another expanded supported search region. For instance, an expanded supported search region can include a diameter that is 1.5 times that of a diameter of supported search region 10100 (as illustrated in FIG. 10), and the expanded supported search region (based on supported search region 10100) can be included in or within expanded supported search region 17154. In one or more embodiments, not utilizing one or more expanded supported search regions, that can be included in or within another expanded supported search region, can decrease one or more calculations and/or computations. In one example, decreasing one or more calculations and/or computations can decrease an amount of time in calculating and/or computing one or more results. In another example, decreasing one or more calculations and/or computations can increase an amount of data that can be processed via a processing unit.

Figure 18:
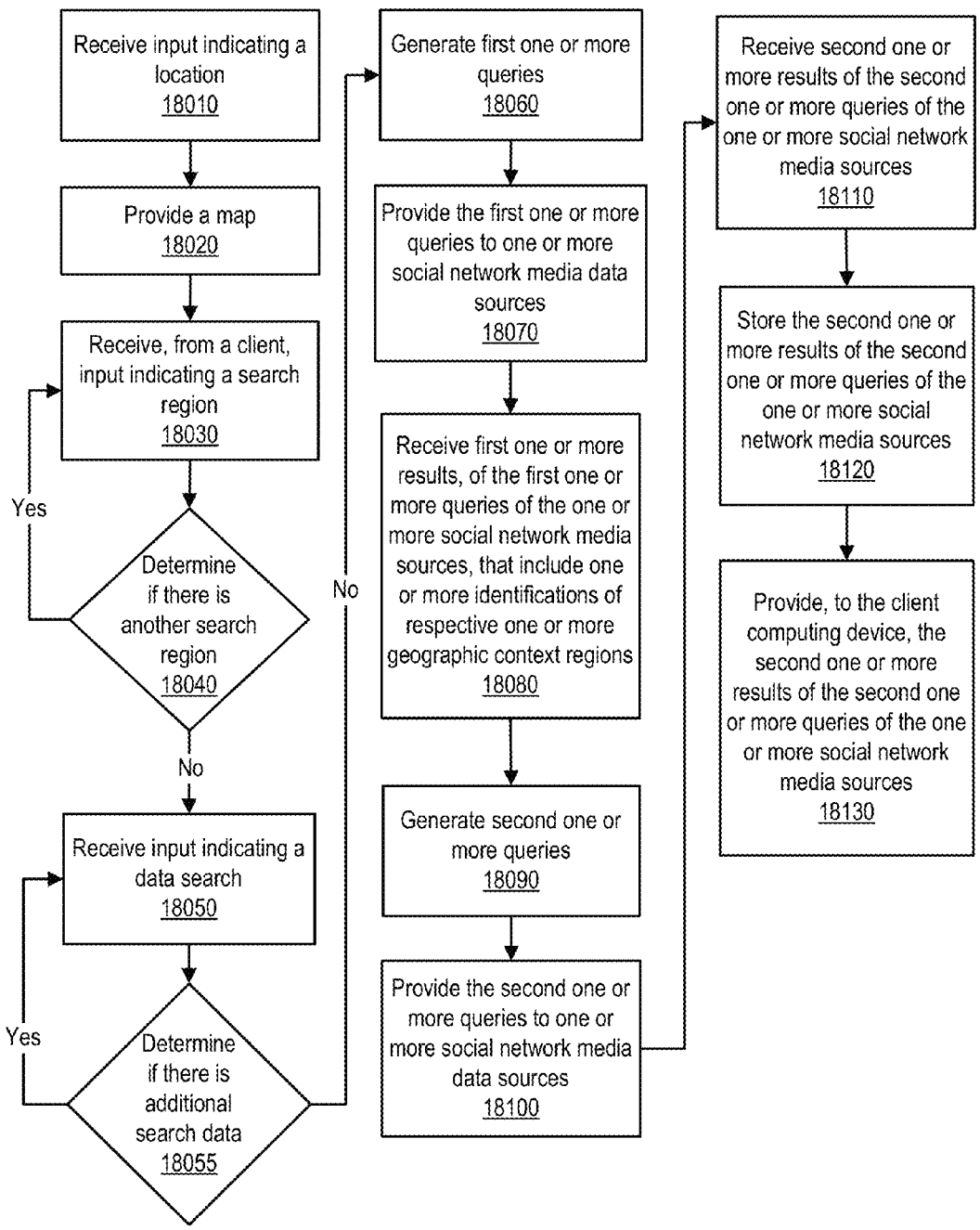
FIG. 18 provides an exemplary method of querying one or more social media data sources based on one or more geographic context regions, according to one or more embodiments.

Turning now to FIG. 18, an exemplary method of querying one or more social media data sources based on one or more geographic context regions is illustrated, according to one or more embodiments. In one or more embodiments, method elements 18010-18055 can be performed in accordance with method elements 3010-3055 of FIG. 3, respectively. For instance, it can be determined if there is additional search data at 18055. If there is additional search data, the method can proceed to 18050. If there is not additional search data, the method can proceed to 18060, where first one or more queries can be generated.

In one or more embodiments, generating the first one or more queries can include expanding a search region. For example, generating the first one or more queries can include expanding a search region of search regions 4110, 8110, 8130, 8150, and 8140 (illustrated in FIG. 14). In one instance, generating the first one or more queries can include expanding search region 4110 with reference to FIG. 15. In another instance, generating the first one or more queries can include expanding search region 8140 with reference to FIGS. 16 and 17.

In one or more embodiments, generating the first one or more queries can include configuring and/or implementing the first one or more queries with one or more expanded supported search region shapes. In one example, generating the first one or more queries can include multiple expanded supported geographical search region shapes (e.g., expanded supported geographical search region shapes 17106-17154 illustrated in FIG. 17). For instance, an expanded supported search region (e.g., expanded search region 16814 as illustrated in FIGS. 16 and 17) can include one or more shapes that are not supported by one or more social media data sources, and the multiple expanded supported geographical search region shapes (e.g., expanded supported geographical search region shapes 17106-17154 illustrated in FIG. 17)

can include the one or more shapes that are not supported by one or more social network media data sources.

In one or more embodiments, generating the first one or more queries can include configuring and/or implementing the first one or more queries to request one or more geographic context regions (e.g., first search data) that are included in and/or are located within the expanded search region. In one example, the expanded search region can include an expanded supported search region shape (e.g., expanded supported search region shape 15411 as illustrated in FIG. 15). In a second example, the expanded search region can include multiple expanded supported search region shapes (e.g., expanded supported search region shapes 1706-17154 as illustrated in FIG. 17). In another example, the expanded search region can include multiple supported search region shapes (e.g., supported search region shapes 11102-11126 as illustrated in FIG. 11). For instance, a combination of the multiple expanded supported search region shapes and the multiple supported search region shapes can cover and/or include an expansion of a shape that is not supported by one or more social network media data sources and an interior of the shape that is not supported by one or more social network media data sources.

At 18070, the first one or more queries can be provided to one or more social media data sources. In one example, one or more of API servers 2020-2024 can provide the first one or more queries to one or more social media data sources, via network 1010. For instance, one or more of API servers 2020-2024 can query one or more social media data sources 1610-1640 based on the first search data (e.g., one or more geographic context region requests) and the one or more expanded search regions. In another example, one or more of application servers 2040-2050 can provide the first one or more queries to one or more social media data sources, via network 1010. For instance, one or more of application servers 2040-2050 can query one or more social media data sources 1610-1640 based on the first search data and the first one or more search regions.

At 18080, first one or more results, of the first one or more queries of the one or more social media data sources, that include one or more identifications of respective one or more geographic context regions can be received. In one example, one or more of API servers 2020-2024 can receive first one or more results of the first query of one or more social media data sources 1610-1640 via network 1010. In one instance, one or more of API servers 2020-2024 can receive identifications of and/or associated with geographic context regions 14110-14160 (illustrated in FIG. 15). In another instance, one or more of API servers 2020-2024 can receive identifications of and/or associated with geographic context regions 14610-14180 (illustrated in FIGS. 16 and 17).

In another example, one or more of application servers 2040-2050 can receive first one or more results of the query of one or more social media data sources 1610-1640 via network 1010. In one instance, one or more of application servers 2040-2050 can receive identifications of and/or associated with geographic context regions 14110-14160 (illustrated in FIG. 15). In another instance, one or more of application servers 2040-2050 can receive identifications of and/or associated with geographic context regions 14610-14180 (illustrated in FIGS. 16 and 17).

At 18090, second one or more queries can be generated. In one example, the second one or more queries can include one or more geographic context regions and/or one or more identifications of and/or associated with the one or more geographic context regions.

In a second example, the second one or more queries can be based on one or more of the one or more geographic context regions, the user input indicating a data search (e.g., second search data), and one or more social network media data sources that store user-provided data (e.g., user input, user-provided content, social network user-provided data, social network user-provided content) from multiple users provided via multiple user computing devices associated with multiple geographic context regions (e.g., two or more of CDs 1110-1126 associated with multiple geographic context regions 14110, 14120, and 14140-14160 as illustrated in FIG. 15; two or more of CDs 1110-1126 associated with multiple geographic context regions 14610, 14630, and 14650-14680 as illustrated in FIG. 16; etc.), among others.

In a third example, the second one or more queries can be based on one or more of the one or more geographic context regions, the user input indicating a data search (e.g., second search data), and one or more social network media data sources that store user-provided data (e.g., user input, user-provided content, social network user-provided data, social network user-provided content) from multiple users provided via multiple user computing devices associated with multiple geographic context regions (e.g., two or more of CDs 1117 and 1120-2236 associated with multiple geographic context regions 14120, 14150, and 14160 as illustrated in FIG. 15; two or more of CDs 1118, 1126, 1121-1125 associated with multiple geographic context regions 14610, 14630, 14660, and 14680 as illustrated in FIG. 16; etc.), among others.

In another example, generating the second one or more queries can include configuring and/or implementing the second one or more queries with second search data such as one or more a word, multiple words, a phrase, a user profile, a portion of a user profile, a regular expression, a natural language filter, a grammar, a social group, an organization, and a user identification, among others. In one instance, the one or more of the word, the multiple words, the phrase, the user profile, the portion of the user profile, the regular expression, the natural language filter, the grammar, the social group, the organization, and the user identification, among others, can match at least a portion of the user-provided data (e.g., user input, user-provided content, social network user-provided data, social network user-provided content) from multiple users provided via multiple user computing devices at multiple locations and/or can produce one or more search results. In another instance, one or more search results can be produced, generated, and/or precipitated via a satisfaction and/or a statistical satisfaction of one or more criteria that can include and/or can be based on the one or more of the word, the multiple words, the phrase, the user profile, the portion of the user profile, the regular expression, the natural language filter, the grammar, the social group, the organization, and the user identification, among others.

In one or more embodiments, generating the second one or more queries can include ignoring and/or eliminating one or more computing device that are within a geographic context region but may not be within a search region. In one example, one or more of CDs 1112 and 1116 of geographic context region 14110, as illustrated in FIG. 15, can be ignored and/or eliminated as one or more of CDs 1112 and 1116 may not be included in search region 4110. In a second example, one or more of CDs 1118, 1119, and 1126 of geographic context region 14120, as illustrated in FIG. 15, can be ignored and/or eliminated as one or more of CDs 1118, 1119, and 1126 may not be included in search region 4110. In another example, one or more of CDs 1117, 1119, and 1120 of geographic context region 14610, as illustrated in FIG. 16, can be ignored and/or eliminated as one or more of CDs 1117, 1119, and 1120 may not be included in search region 8140.

At 18100, the second one or more queries can be provided to one or more social media data sources. In one example, one or more of API servers 2020-2024 can provide the second one or more queries to one or more social media data sources, via network 1010. For instance, one or more of API servers 2020-2024 can query one or more social media data sources 1610-1640 based on the second search data and the one or more geographic context regions. In another example, one or more of application servers 2040-2050 can provide the second one or more queries to one or more social media data sources, via network 1010. For instance, one or more of application servers 2040-2050 can query one or more social media data sources 1610-1640 based on the second search data and the one or more geographic context regions.

At 18110, second one or more results, of the second one or more queries of the one or more social media data sources, can be received. In one example, one or more of API servers 2020-2024 can receive second one or more results of the second one or more queries of one or more social media data sources 1610-1640 via network 1010. In another example, one or more of application servers 2040-2050 can receive second one or more results of the second one or more queries of one or more social media data sources 1610-1640 via network 1010.

At 18120, the second one or more results of the second one or more queries of the one or more social media data sources can be stored. For example, a database can store the results of the second one or more queries of the social media data sources. For instance, one or more of databases 2030-2034 can store the results of the second one or more queries of social media data sources 1610-1640.

At 18130, the second one or more results of the second one or more queries of the one or more social media data sources can be provided to the client. In one example, one or more of API servers 2020-2024 can provide the results of the second one or more queries of social media data sources 1610-1640 to the client via network 1010. In another example, one or more of application servers 2040-050 can provide the results of the second one or more queries of social media data sources 1610-1640 to the client via network 1010.

In one or more embodiments, a computer system, a computing device, and/or a computer can be broadly characterized to include any device that includes a processor that executes instructions from a memory medium. For example, the term "memory medium" can mean a "memory", a "memory device", "storage device", and/or "tangible computer readable storage medium". In one instance, one or more of a "memory", a "memory device", "storage device" and "tangible computer readable storage medium" can include volatile storage such as random access memory (RAM), SRAM (static RAM), DRAM (dynamic RAM), EDO RAM (extended data out RAM), Rambus RAM, etc. In another instance, one or more of a "memory", a "memory device", and "tangible computer readable storage medium" can include nonvolatile storage such as a ROM (read only memory), a PROM (programmable ROM), an EPROM (erasable PROM), an EEPROM (electrically erasable PROM), flash memory, NVRAM (nonvolatile RAM), FRAM (ferroelectric RAM), a CD-ROM, a DVD-ROM, a floppy disk, a magnetic tape, a magnetic media (e.g., a hard drive), optical storage, etc. In one or more embodiments, a memory medium can include one or more volatile storages and/or one or more nonvolatile storages.

In one or more embodiments, a processor (e.g., a central processing unit or CPU) can execute instructions from a memory medium that stores the instructions that can include one or more software programs in accordance with one or more of methods, processes and/or flowcharts described herein. In one example, the processor and the memory medium, that stores the instructions which can include one or more software programs in accordance with one or more of methods, processes and/or flowcharts described herein, can form one or more means for one or more functionalities described with references to methods, processes and/or flowcharts herein. In a second example, a GPU and the memory medium, that stores the instructions which can include one or more software programs in accordance with one or more of methods, processes and/or flowcharts described herein, can form one or more means for one or more functionalities described with references to methods, processes and/or flowcharts herein.

In a third example, a FPGA can be configured with one or more configurations in accordance with one or more of methods, processes and/or flowcharts described herein, that can form one or more means for one or more functionalities described with references to methods, processes and/or flowcharts herein. In a fourth example, an ASIC and the memory medium, that stores the instructions which can include one or more software programs in accordance with one or more of methods, processes and/or flowcharts described herein, can form one or more means for one or more functionalities described with references to methods, processes and/or flowcharts herein. In a fifth example, an ASIC can be configured with one or more configurations in accordance with one or more of methods, processes and/or flowcharts described herein, that can form one or more means for one or more functionalities described with references to methods, processes and/or flowcharts herein.

In a sixth example, an ASIC and the memory medium, that stores the instructions which can include one or more software programs in accordance with one or more of methods, processes and/or flowcharts described herein, can form one or more means for one or more functionalities described with references to methods, processes and/or flowcharts herein. In another example, the memory medium, that stores the instructions which can include one or more software programs in accordance with one or more of methods, processes and/or flowcharts described herein, can include, implement, and/or form an article of manufacture. When terms are used in this disclosure in the singular they shall be deemed to include the plural when applicable, and when used herein in the plural to include the singular when applicable.

One or more of the method elements described herein and/or one or more portions of an implementation of a method element can be repeated, can be performed in varying orders, can be performed concurrently with one or more of the other method elements and/or one or more portions of an implementation of a method element, or can be omitted, according to one or more embodiments. In one or more embodiments, concurrently can mean simultaneously. In one or more embodiments, concurrently can mean apparently simultaneously according to some metric. For example, two tasks can be context switched such that such that they appear to be simultaneous to a human. In one instance, a first task of the two tasks can include a first method element and/or a first portion of a first method element. In a second instance, a second task of the two tasks can include a second method element and/or a first portion of a second method element. In another instance, a second task of the two tasks can include the first method element and/or a second portion of the first method element. Further, one or more of the system elements described herein can be omitted and additional system elements can be added as desired, according to one or more embodiments. Moreover, supplementary, additional, and/or duplicated method elements can be instantiated and/or performed as desired, according to one or more embodiments.

One or more modifications and/or alternatives of the embodiments described herein may be apparent to those skilled in the art in view of this description. Hence, descriptions of the embodiments, described herein, are to be taken and/or construed as illustrative and/or exemplary only and are for the purpose of teaching those skilled in the art the general manner of carrying out methods, processes, and/or systems described herein. In one or more embodiments, one or more materials and/or elements can be swapped or substituted for those illustrated and described herein. In one or more embodiments, one or more parts and/or processes can be reversed, and/or certain one or more features of the described one or more embodiments can be utilized independently, as would be apparent to one skilled in the art after having the benefit of this description.

What is claimed is:

1. A system, comprising:
a processor;
a network interface, coupled to the processor and configured to be coupled to a network; and
a memory device coupled to the processor, wherein the memory device stores instructions that are executed by the processor, wherein the system:
receives, from a computing device, via the network interface and the network, a first query of at least one social network media data source indicating search data and a first geographical search region, wherein the at least one social network media data source stores user-provided data from a plurality of users provided via a plurality of computing devices associated with at least the first geographical search region;
determines the first geographical search region covers a first geographical area and at least a first portion of a geographic context region intersecting the first geographical search region, wherein a first location within the geographic context region is not within the first geographical search region and wherein first social media results of the at least one social network media data source in response to the first query will not include one or more second social media results associated with one or more second locations within both the first portion of the geographic context region and the first geographical search region, at least because the one or more second locations are associated with the geographic context region and the first location is not within the first geographical search region;
in response to determining the first geographical search region covers the first geographical area and the at least a first portion of the geographic context region intersecting the first geographical search region, generates at least a second query of the at least one social network media data source indicating the search data and a second geographical search region covering a second geographical area including at least a second portion of the geographic context region including the first location and the one or more second locations within the geographic context region;
provides, via the network interface and the network, the at least the second query to the at least one social network media data source;
receives, from the at least one social network media data source via the network interface and the network, at least one result based on the at least the second query and based on the user-provided data stored via the at least one social network media data source, wherein the at least one result includes the one or more second social media results associated with the one or more second locations within the geographic context region and the first geographical search region; and
provides the at least one result to the computing device.

2. The system of claim 1, further comprising expands the first geographical search region to the second geographical search region to determine if one or more geographic context regions intersect the first geographical search region, wherein the second geographical search region covers more geographical area then the first geographical search region, and generates at least the second query in response to determining the geographic context region intersects the first geographical search region.

3. The system of claim 2, wherein when the system expands the first geographical search region, the system expands a plurality of supported geographical search region shapes, of the at least one social network media data source, based on the first geographical search region.

4. The system of claim 1, wherein when the system generates the at least the second query that includes the at least one identification of the geographic context region and that is based on the search data and the at least one social network media data source, the system transforms the first query in accordance with at least one interface of the at least one social network media data source such that the at least the second query is supported as a query of the at least one social network media data source.

5. The system of claim 1,
wherein the at least the second query includes at least one of a word, a plurality of words, a phrase, a user profile, a portion of a user profile, a regular expression, a natural language filter, a grammar, a social group, an organization, and a user identification;
wherein at least a portion of the user-provided data from the plurality of users corresponds to the at least one result and at least one of the word, the plurality of words, the phrase, the user profile, the portion of the user profile, the regular expression, the natural language filter, the grammar, the social group, the organization, and the user identification; and
wherein the at least one result is based on the at least the portion of the user-provided data from the plurality of users that corresponds to the at least one result and the at least one of the word, the plurality of words, the phrase, the user profile, the portion of the user profile, the regular expression, the natural language filter, the grammar, the social group, the organization, and the user identification.

6. The system of claim 5, wherein the user-provided data includes at least one post to at least one social network service.

7. The system of claim 5, wherein the grammar includes at least one of a set of formation rules for strings in a language, a context-free grammar, a regular grammar, a tree-adjoining grammar, an affix grammar, an attribute grammar, an adaptive grammar, an ambiguous grammar, and a categorical grammar.

8. The system of claim 5, wherein the user profile includes at least one of a user name, the user identification, a mobile telephone number, an email address, a physical address, an occupation, a gender, a marital status, a past purchase, an interest, a past transaction, a shoe size, an age, a clothing size, a political affiliation, a monthly income, a yearly income, an employment status, a credit history, a credit rating, an eye color, a hair color, a music genre, and a membership.

9. The system of claim 5, wherein the user-provided data from the plurality of users includes social network user-provided content.

10. The system of claim 1,
wherein the first geographical search region includes a first unsupported geographical search region shape; and
wherein the system generates the at least the second query such that a plurality of geographical search region shapes that are supported by the at least one interface of the at least one social network media data source and that include the first unsupported geographical search region shape.

11. The system of claim 10, wherein the system generates the at least the second query such that the plurality of geographical search region shapes, supported by the at least one interface of the at least one social network media data source, include an expansion of the first unsupported geographical search region shape.

12. The system of claim 11, wherein when the system receives, from the at least one social network media data source via the network interface and the network, the at least one result, the system receives a plurality of results that are based on the at least the second query and the plurality of geographical search region shapes, supported by the at least one interface of the at least one social network media data source, that include the expansion of the first unsupported geographical search region shape, wherein the plurality of results include the at least one result.

13. The system of claim 12,
wherein a first result of the plurality of results is a duplicate result of a second result of the plurality of results; and
wherein the system further eliminates the duplicate result.

14. The system of claim 1,
provides, via the network interface and the network, the first query to the at least one social network media data source.

15. The system of claim 14,
wherein the at least one result includes at least one location of the geographic context region; and
wherein the system further provides the at least one location of the geographic context region to the user via the map.

16. The system of claim 14,
wherein the second geographical area includes at least the first portion of the geographic context region and the second portion of the geographic context region.

17. The system of claim 1, wherein the system further provides a map to a user, wherein the map indicates at least one location of the geographic context region that corresponds to the at least one result based on the at least one query and based on location-based data stored via the at least one social network media data source.

18. The system of claim 1, wherein the user-provided data stored via the at least one social network media data source includes user-provided data stored via at least one of FACEBOOK social network media data source, TWITTER social network media data source, YOUTUBE social network media data source, WEIBO social network media data source, a blog, a wiki, FOURSQUARE social network media data source, INSTAGRAM social network media data source, FLICKR social network media data source, VIMEO social network media data source, and YELP social network media data source.

19. The system of claim 1, wherein the at least one identification of the geographic context region is determined via a communication system operated by a network provider and utilized by at least one of the plurality of computing devices.

20. The system of claim 19,
wherein the communication system includes at least one of a wireless access point and a wired access point; and
wherein the at least one identification of the geographic context region is determined via a location of the at least one of the wireless access point and the wired access point.

21. The system of claim 19,
wherein the at least one of the plurality of computing devices utilizes a network address associated with the communication system; and
wherein the network address is associated with the at least one identification of the geographic context region.

22. The system of claim 1,
wherein a location included within the geographic context region is determined via a position device of at least one of the plurality of computing devices; and
wherein the user-provided data from the plurality of users provided via the plurality of computing devices includes the location included within the geographic context region.

23. The system of claim 1,
wherein the geographic context region is associated with a geometric center and the first location is associated with the geometric center of the geographic context region.

24. The system of claim 1,
wherein the system is coupled to a storage; and
wherein the system further:
stores the at least the second query in the storage;
after an amount of time transpires, retrieves the at least the second query from the storage;
provides, via the network, the at least the second query from the storage to the at least one social network media data source;
receives, from the at least one social network media data source via the network, at least a second result based on the at least the second query from storage and based on the user-provided data stored via the at least one social network media data source; and
provides the at least the second result to the computing device.

25. The system of claim 24,
wherein when the system stores the at least the second query in the storage, the system stores the at least the second query in the storage via the network; and
wherein when the system retrieves the at least the second query from the storage, the system retrieves the at least the second query from the storage via the network.

26. The system of claim 1, wherein the geographic context region includes at least one of a voting district, a congressional district, a school district, a school, a campus, a dormitory, an oil pipeline, a sports complex, a police precinct, a piece of real estate, a neighborhood, a borrow, a city, a town, a commercial office building, a floor of a building, a factory, a refinery, a storage facility, a power station, a power substation, a military installation, and a census designated place.

27. A non-transitory computer readable memory device, comprising instructions that are executable by a processor of a computer system, wherein as the instructions executed by the processor, the computer system:
  receives, from a computing device, via the network interface and the network, a first query of at least one social network media data source indicating search data and a first geographical search region, wherein the at least one social network media data source stores user-provided data from a plurality of users provided via a plurality of computing devices associated with at least the first geographical search region;
  determines the first geographical search region covers a first geographical area and at least a first portion of a geographic context region intersecting the first geographical search region, wherein a first location within the geographic context region is not within the first geographical search region and wherein first social media results of the at least one social network media data source in response to the first query will not include one or more second social media results associated with one or more second locations within both the first portion of the geographic context region and the first geographical search region, at least because the one or more second locations are associated with the geographic context region and the first location is not within the first geographical search region;
  in response to determining the first geographical search region covers the first geographical area and the at least a first portion of the geographic context region intersecting the first geographical search region, generates at least a second query of the at least one social network media data source indicating the search data and a second geographical search region covering a second geographical area including at least a second portion of the geographic context region including the first location and the one or more second locations within the geographic context region;
  provides, via the network interface and the network, the at least the second query to the at least one social network media data source;
  receives, from the at least one social network media data source via the network interface and the network, at least one result based on the at least the second query and based on the user-provided data stored via the at least one social network media data source, wherein the at least one result includes the one or more second social media results associated with the one or more second locations within the geographic context region and the first geographical search region; and
  provides the at least one result to the computing device.

28. The non-transitory computer readable memory device of claim 27, further comprising expands the first geographical search region to the second geographical search region to determine if one or more geographic context regions intersect the first geographical search region, wherein the second geographical search region covers more geographical area then the first geographical search region, and generates at least the second query in response to determining the geographic context region intersects the first geographical search region.

29. The non-transitory computer readable memory device of claim 28, wherein when the computer system expands the first geographical search region, the computer system expands a plurality of supported geographical search region shapes, of the at least one social network media data source, based on the first geographical search region.

30. The non-transitory computer readable memory device of claim 27, wherein when the computer system generates the at least the second query that includes the at least one identification of the geographic context region and that is based on the search data and the at least one social network media data source, the computer system transforms the first query in accordance with at least one interface of the at least one social network media data source such that the at least the second query is supported as a query of the at least one social network media data source.

31. The non-transitory computer readable memory device of claim 27, wherein the second query includes at least one of a word, a plurality of words, a phrase, a user profile, a portion of a user profile, a regular expression, a natural language filter, a grammar, a social group, an organization, and a user identification;
  wherein at least a portion of the user-provided data from the plurality of users corresponds to the at least one result and at least one of the word, the plurality of words, the phrase, the user profile, the portion of the user profile, the regular expression, the natural language filter, the grammar, the social group, the organization, and the user identification; and
  wherein the at least one result is based on the at least the portion of the user-provided data from the plurality of users that corresponds to the at least one result and the at least one of the word, the plurality of words, the phrase, the user profile, the portion of the user profile, the regular expression, the natural language filter, the grammar, the social group, the organization, and the user identification.

32. The non-transitory computer readable memory device of claim 31, wherein the user-provided data includes at least one post to at least one social network service.

33. The non-transitory computer readable memory device of claim 31, wherein the grammar includes at least one of a set of formation rules for strings in a language, a context-free grammar, a regular grammar, a tree-adjoining grammar, an affix grammar, an attribute grammar, an adaptive grammar, an ambiguous grammar, and a categorical grammar.

34. The non-transitory computer readable memory device of claim 31, wherein the user profile includes at least one of a user name, the user identification, a mobile telephone number, an email address, a physical address, an occupation, a gender, a marital status, a past purchase, an interest, a past transaction, a shoe size, an age, a clothing size, a political affiliation, a monthly income, a yearly income, an employment status, a credit history, a credit rating, an eye color, a hair color, a music genre, and a membership.

35. The non-transitory computer readable memory device of claim 31, wherein the user-provided data from the plurality of users includes social network user-provided content.

36. The non-transitory computer readable memory device of claim 27,
  wherein the first geographical search region includes a first unsupported geographical search region shape; and
  wherein the computer system generates the at least the second query such that a plurality of geographical search region shapes that are supported by the at least one interface of the at least one social network media data source and that include the first unsupported geographical search region shape.

37. The non-transitory computer readable memory device of claim 36, wherein the computer system generates the at least the second query such that the plurality of geographical search region shapes, supported by the at least one interface of the at least one social network media data source, include an expansion of the first unsupported geographical search region shape.

38. The non-transitory computer readable memory device of claim 37, wherein when the computer system receives, from the at least one social network media data source via the network interface and the network, the at least one result based on the search data that is based on the at least the second query, the computer system receives a plurality of results that are based on the second query and the plurality of geographical search region shapes, supported by the at least one interface of the at least one social network media data source, that include the expansion of the first unsupported geographical search region shape, wherein the plurality of results include the at least one result.

39. The non-transitory computer readable memory device of claim 36, wherein a first result of the plurality of results is a duplicate result of a second result of the plurality of results; and
wherein the computer system further eliminates the duplicate result.

40. The non-transitory computer readable memory device of claim 27,
provides, via the network interface and the network, the first query to the at least one social network media data source.

41. The computer readable memory device of claim 40, wherein the at least one result includes at least one location of the geographic context region; and
wherein the computer system further provides the at least one location of the geographic context region to the user via the map.

42. The non-transitory computer readable memory device of claim 40,
wherein the second geographical area includes at least the first portion of the geographic context region and the second portion of the geographic context region.

43. The non-transitory computer readable memory device of claim 27, wherein the computer system further provides a map to a user, wherein the map indicates at least one location of the geographic context region that corresponds to the at least one result based on the at least one query and based on location-based data stored via the at least one social network media data source.

44. The non-transitory computer readable memory device of claim 27, wherein the user-provided data stored via the at least one social network media data source includes user-provided data stored via at least one of FACEBOOK social network media data source, TWITTER social network media data source, YOUTUBE social network media data source, WEIBO social network media data source, a blog, a wiki, FOURSQUARE social network media data source, INSTAGRAM social network media data source, FLICKR social network media data source, VIMEO social network media data source, and YELP social network media data source.

45. The non-transitory computer readable memory device of claim 27, wherein the at least one identification of the geographic context region is determined via a communication system operated by a network provider and utilized by at least one of the plurality of computing devices.

46. The non-transitory computer readable memory device of claim 45, wherein the communication system includes at least one of a wireless access point and a wired access point; and
wherein the at least one identification of the geographic context region is determined via a location of the at least one of the wireless access point and the wired access point.

47. The non-transitory computer readable memory device of claim 45,
wherein the at least one of the plurality of computing devices utilizes a network address associated with the communication system; and
wherein the network address is associated with the at least one identification of the geographic context region.

48. The non-transitory computer readable memory device of claim 27,
wherein a location included within the geographic context region is determined via a position device of at least one of the plurality of computing devices; and
wherein the user-provided data from the plurality of users provided via the plurality of computing devices includes the location included within the geographic context region.

49. The non-transitory computer readable memory device of claim 27,
wherein the geographic context region is associated with a geometric center and the first location is associated with the geometric center of the geographic context region.

50. The non-transitory computer readable memory device of claim 27,
wherein the computer system is coupled to a storage; and
wherein the computer system further:
stores the at least the second query in the storage;
after an amount of time transpires, retrieves the at least the second query from the storage;
provides, via the network, the at least the second query from the storage to the at least one social network media data source;
receives, from the at least one social network media data source via the network, at least a second result based on the at least the second query from storage and based on the user-provided data stored via the at least one social network media data source; and
provides the at least the second result to the computing device.

51. The non-transitory computer readable memory device of claim 50,
wherein when the computer system stores the at least the second query in the storage, the computer system stores the at least the second query in the storage via the network; and
wherein when the computer system retrieves the at least the second query from the storage, the computer system retrieves the at least the second query from the storage via the network.

52. The non-transitory computer readable memory device of claim 27, wherein the geographic context region includes at least one of a voting district, a congressional district, a school district, a school, a campus, a dormitory, an oil pipeline, a sports complex, a police precinct, a piece of real estate, a neighborhood, a borrow, a city, a town, a commercial office building, a floor of a building, a factory, a refinery, a storage facility, a power station, a power substation, a military installation, and a census designated place.

53. A method, comprising:
- receiving, from a computing device, via the network interface and the network, a first query of at least one social network media data source indicating search data and a first geographical search region, wherein the at least one social network media data source stores user-provided data from a plurality of users provided via a plurality of computing devices associated with at least the first geographical search region;
- determining the first geographical search region covers a first geographical area and at least a first portion of a geographic context region intersecting the first geographical search region, wherein a first location within the geographic context region is not within the first geographical search region and wherein first social media results of the at least one social network media data source in response to the first query will not include one or more second social media results associated with one or more second locations within both the first portion of the geographic context region and the first geographical search region, at least because the one or more second locations are associated with the geographic context region and the first location is not within the first geographical search region;
- in response to determining the first geographical search region covers the first geographical area and the at least a first portion of the geographic context region intersecting the first geographical search region, generates at least a second query of the at least one social network media data source indicating the search data and a second geographical search region covering a second geographical area including at least a second portion of the geographic context region including the first location and the one or more second locations within the geographic context region;
- providing, via the network interface and the network, the at least the second query to the at least one social network media data source;
- receiving, from the at least one social network media data source via the network interface and the network, at least one result based on the at least the second query and based on the user-provided data stored via the at least one social network media data source, wherein the at least one result includes the one or more second social media results associated with the one or more second locations within the geographic context region and the first geographical search region; and
- providing the at least one result to the computing device.

54. The method of claim 53, further comprising: further comprising expanding the first geographical search region to the second geographical search region to determine if one or more geographic context regions intersect the first geographical search region, wherein the second geographical search region covers more geographical area then the first geographical search region, and generates at least the second query in response to determining the geographic context region intersects the first geographical search region.

55. The method of claim 54, wherein expanding the first geographical search region includes expanding a plurality of supported geographical search region shapes, of the at least one social network media data source, based on the first geographical search region.

56. The method of claim 53, wherein generating the at least the second query that includes the at least one identification of the geographic context region and that is based on the search data and the at least one social network media data source includes transforming the first query in accordance with at least one interface of the at least one social network media data source such that the at least the second query is supported as a query of the at least one social network media data source.

57. The method of claim 53,
- wherein the at least the second query includes at least one of a word, a plurality of words, a phrase, a user profile, a portion of a user profile, a regular expression, a natural language filter, a grammar, a social group, an organization, and a user identification;
- wherein at least a portion of the user-provided data from the plurality of users corresponds to the at least one result and at least one of the word, the plurality of words, the phrase, the user profile, the portion of the user profile, the regular expression, the natural language filter, the grammar, the social group, the organization, and the user identification; and
- wherein the at least one result is based on the at least the portion of the user-provided data from the plurality of users that corresponds to the at least one result and the at least one of the word, the plurality of words, the phrase, the user profile, the portion of the user profile, the regular expression, the natural language filter, the grammar, the social group, the organization, and the user identification.

58. The method of claim 57, wherein the user-provided data includes at least one post to at least one social network service.

59. The method of claim 57, wherein the grammar includes at least one of a set of formation rules for strings in a language, a context-free grammar, a regular grammar, a tree-adjoining grammar, an affix grammar, an attribute grammar, an adaptive grammar, an ambiguous grammar, and a categorical grammar.

60. The method of claim 57, wherein the user profile includes at least one of a user name, the user identification, a mobile telephone number, an email address, a physical address, an occupation, a gender, a marital status, a past purchase, an interest, a past transaction, a shoe size, an age, a clothing size, a political affiliation, a monthly income, a yearly income, an employment status, a credit history, a credit rating, an eye color, a hair color, a music genre, and a membership.

61. The method of claim 57, wherein the user-provided data from the plurality of users includes social network user-provided content.

62. The method of claim 57,
- wherein the first geographical search region includes a first unsupported geographical search region shape;
- wherein generating the at least the second query includes generating the at least the second query such that a plurality of geographical search region shapes that are supported by the at least one interface of the at least one social network media data source and that include the first unsupported geographical search region shape.

63. The method of claim 62, wherein generating the at least the second query includes generating the at least the second query such that the plurality of geographical search region shapes, supported by the at least one interface of the at least one social network media data source, include an expansion of the first unsupported geographical search region shape.

64. The method of claim 63, wherein receiving, from the at least one social network media data source via the network interface and the network, the at least one result includes receiving a plurality of results that are based on the at least the second query and the plurality of geographical search region shapes, supported by the at least one interface of the at least one social network media data source, that include the expansion of the first unsupported geographical search region shape, wherein the plurality of results include the at least one result.

65. The method of claim 64, wherein a first result of the plurality of results is a duplicate result of a second result of the plurality of results;
    the method further comprising:
        eliminating the duplicate result.

66. The method of claim 53, further comprising:
    providing, via the network interface and the network, the first query to the at least one social network media data source.

67. The method of claim 66, wherein the at least one result includes at least one location of the geographic context region;
    the method further comprising:
        providing the at least one location of the geographic context region to the user via the map.

68. The method of claim 56, wherein the second geographical area includes at least the first portion of the geographic context region and the second portion of the geographic context region.

69. The method of claim 53, further comprising:
    providing a map to a user, wherein the map indicates at least one location of the geographic context region that corresponds to the at least one result based on the at least one query and based on location-based data stored via the at least one social network media data source.

70. The method of claim 53, wherein the user-provided data stored via the at least one social network media data source includes user-provided data stored via at least one of FACEBOOK social network media data source, TWITTER social network media data source, YOUTUBE social network media data source, WEIBO social network media data source, a blog, a wiki, FOURSQUARE social network media data source, INSTAGRAM social network media data source, FLICKR social network media data source, VIMEO social network media data source, and YELP social network media data source.

71. The method of claim 53, wherein the at least one identification of the geographic context region is determined via a communication system operated by a network provider and utilized by at least one of the plurality of computing devices.

72. The method of claim 71,
    wherein the communication system includes at least one of a wireless access point and a wired access point; and
    wherein the at least one identification of the geographic context region is determined via a location of the at least one of the wireless access point and the wired access point.

73. The method of claim 71,
    wherein the at least one of the plurality of computing devices utilizes a network address associated with the communication system; and
    wherein the network address is associated with the at least one identification of the geographic context region.

74. The method of claim 53,
    wherein a location included within the geographic context region is determined via a position device of at least one of the plurality of computing devices; and
    wherein the user-provided data from the plurality of users provided via the plurality of computing devices includes the location included within the geographic context region.

75. The method of claim 53,
    wherein the geographic context region is associated with a geometric center and the first location is associated with the geometric center of the geographic context region.

76. The method of claim 53, further comprising:
    storing the at least the second query in the storage;
    after an amount of time transpires, retrieves the at least the second query from the storage;
    providing, via the network, the at least the second query from the storage to the at least one social network media data source;
    receiving, from the at least one social network media data source via the network, at least a second result based on the at least the second query from storage and based on the user-provided data stored via the at least one social network media data source; and
    providing the at least the second result to the computing device.

77. The method of claim 76,
    wherein storing the at least the second query in the storage includes storing the at least the second query in the storage via the network; and
    wherein retrieving the at least the second query from the storage includes retrieving the at least the second query from the storage via the network.

78. The method of claim 53, wherein the geographic context region includes at least one of a voting district, a congressional district, a school district, a school, a campus, a dormitory, an oil pipeline, a sports complex, a police precinct, a piece of real estate, a neighborhood, a borrow, a city, a town, a commercial office building, a floor of a building, a factory, a refinery, a storage facility, a power station, a power substation, a military installation, and a census designated place.

* * * * *